United States Patent [19]

Isaacson

[11] 4,286,330
[45] Aug. 25, 1981

[54] AUTONOMIC STRING-MANIPULATION SYSTEM

[76] Inventor: Joel D. Isaacson, 7370 Stratford Ave., University City, Mo. 63130

[21] Appl. No.: 33,623

[22] Filed: Apr. 26, 1979

Related U.S. Application Data

[63] Continuation of Ser. No. 674,658, Apr. 7, 1976.

[51] Int. Cl.³ ............... G06F 7/04; G06K 9/00
[52] U.S. Cl. ............... 364/900; 340/146.3 MA; 364/513; 364/515; 364/725; 371/69
[58] Field of Search ............ 340/146.3 H, 146.3 MA, 340/146.1; 364/515, 200, 900, 513, 725, 740; 358/260, 261, 262; 235/92 EV; 307/238; 371/31, 37, 43, 69

[56] References Cited

U.S. PATENT DOCUMENTS

| | | | |
|---|---|---|---|
| T956,003 | 3/1977 | Simone | 364/200 |
| 3,106,699 | 10/1963 | Kamentsky | 340/146.3 H |
| 3,196,398 | 7/1965 | Baskin | 340/146.3 H |
| 3,271,745 | 9/1966 | Schauer | 340/172.5 |
| 3,347,981 | 10/1967 | Kagan et al. | 340/146.3 H |
| 3,430,207 | 2/1969 | Davis | 340/172.5 |
| 3,544,773 | 12/1970 | Peddie | 235/92 EV |
| 3,569,678 | 3/1971 | Emde | 235/92 EV |
| 3,576,973 | 5/1971 | Draper | 235/92 EV |
| 3,613,084 | 10/1971 | Armstrong | 364/900 |
| 3,657,704 | 4/1972 | Boehm | 364/900 |
| 3,775,753 | 11/1973 | Kastner | 340/172.5 |
| 3,792,440 | 2/1974 | Murakoshi | 340/172.5 |
| 3,794,854 | 2/1974 | Hanson et al. | 307/238 |
| 3,866,188 | 2/1975 | Watanabe | 307/238 X |
| 3,904,891 | 9/1975 | O'Lear | 307/238 |
| 3,914,627 | 10/1975 | Meier | 307/238 |
| 3,916,387 | 10/1975 | Woodrum | 340/172.5 |
| 3,921,151 | 11/1975 | Guanella | 340/172.5 |
| 3,921,153 | 11/1975 | Belady et al. | 340/172.5 |
| 3,930,144 | 12/1975 | Tanaka | 235/92 EV |
| 4,003,022 | 1/1977 | Takahashi et al. | 340/46.3 MA |
| 4,034,344 | 7/1977 | Saraga et al. | 340/146.3 MA |
| 4,060,713 | 11/1977 | Golay | 340/146.3 MA |
| 4,167,728 | 9/1979 | Sternberg | 340/146.3 MA |

Primary Examiner—Leo H. Boudreau

[57] ABSTRACT

Method and means in the field of data processing, relating to the subfield of artificial or machine intelligence. These are concerned with finite strings of arbitrary symbols and their manipulation, including operations on strings, processes defined in terms of said operations, devices that embody said processes, and combinations of said processes and devices with conventional data processing systems to effect useful processing of data. The most important operation and process are, respectively, Tetracoding (TTC), and Basic Intellector Process (BIP). INTELLECTOR is a hardware implementation of $BIP_s$, which is a functionally equivalent variant of BIP. One or more INTELLECTORs are connectable to conventional digital data processing systems, combining their respective autonomic and programmed data processing capabilities.

10 Claims, 9 Drawing Figures

|    | 01 | 02 | 03 | 04 | 05 | 06 | 07 | 08 | 09 | 10 | 11 | 12 | 13 | 14 | 15 |
|----|----|----|----|----|----|----|----|----|----|----|----|----|----|----|----|
| 00 | S  | E  | E  | P  | E  | R  | F  | E  | C  | T  | C  | Y  | C  | L  | E  |
| 01 | A  | B  | C  | A  | A  | A  | A  | A  | A  | A  | A  | A  | A  | A  | A  |
| 02 | A  | A  | A  | B  | D  | D  | D  | D  | D  | D  | D  | D  | D  | D  | C  |
| 03 | B  | D  | C  | A  | B  | D  | D  | D  | D  | D  | D  | D  | C  | A  |    |
| 04 | A  | A  | A  | A  | B  | D  | D  | D  | D  | D  | D  | C  | A  | A  |    |
| 05 | B  | D  | D  | D  | C  | A  | B  | D  | D  | D  | C  | A  | B  | C  |    |
| 06 | A  | B  | D  | C  | A  | A  | A  | B  | D  | D  | C  | A  | A  | A  | A  |
| 07 | A  | A  | A  | A  | B  | D  | C  | A  | B  | C  | A  | B  | D  | D  | C  |
| 08 | B  | D  | D  | C  | A  | A  | A  | A  | A  | A  | A  | B  | C  | A  |    |
| 09 | A  | B  | C  | A  | B  | D  | D  | D  | D  | D  | C  | A  | A  | A  |    |
| 10 | A  | A  | A  | A  | B  | D  | D  | D  | D  | C  | A  | B  | D  | C  |    |
| 11 | B  | D  | D  | D  | C  | A  | B  | D  | D  | C  | A  | A  | A  | A  |    |
| 12 | A  | B  | D  | C  | A  | A  | A  | B  | C  | A  | B  | D  | D  | D  | C  |
| 13 | A  | A  | A  | A  | B  | D  | C  | A  | A  | A  | B  | D  | C  | A  |    |
| 14 | B  | D  | D  | C  | A  | A  | A  | B  | D  | D  | C  | A  | A  | A  |    |
| 15 | A  | B  | C  | A  | B  | D  | C  | A  | B  | C  | A  | B  | D  | D  | C  |
| 16 | A  | A  | A  | A  | A  | A  | A  | A  | A  | A  | A  | B  | C  | A  |    |
| 17 | B  | D  | D  | D  | D  | D  | D  | D  | D  | D  | C  | A  | A  | A  |    |
| 18 | A  | B  | D  | D  | D  | D  | D  | D  | D  | C  | A  | B  | D  | C  |    |
| 19 | A  | A  | B  | D  | D  | D  | D  | D  | C  | A  | A  | A  | A  | A  |    |
| 20 | B  | C  | A  | B  | D  | D  | D  | C  | A  | B  | D  | D  | D  | C  |    |
| 21 | A  | A  | A  | A  | B  | D  | D  | C  | A  | A  | A  | B  | D  | C  | A  |
| 22 | B  | D  | D  | C  | A  | B  | C  | A  | B  | D  | C  | A  | A  | A  | A  |
| 23 | A  | B  | C  | A  | A  | A  | A  | A  | A  | A  | B  | D  | D  | C  |    |
| 24 | A  | A  | A  | B  | D  | D  | D  | D  | D  | C  | A  | B  | C  | A  |    |
| 25 | B  | D  | C  | A  | B  | D  | D  | D  | C  | A  | A  | A  | A  | A  |    |
| 26 | A  | A  | A  | A  | B  | D  | D  | C  | A  | B  | D  | D  | D  | C  |    |
| 27 | B  | D  | D  | D  | C  | A  | B  | C  | A  | A  | A  | B  | D  | C  | A  |
| 28 | A  | B  | D  | C  | A  | A  | A  | B  | D  | C  | A  | A  | A  | A  |    |
| 29 | A  | A  | A  | B  | D  | D  | C  | A  | A  | A  | B  | D  | D  | C  |    |
| 30 | B  | D  | D  | C  | A  | B  | C  | A  | B  | D  | C  | A  | B  | C  | A  |
| 31 | A  | B  | C  | A  | A  | A  | A  | A  | A  | A  | A  | A  | A  | A  | A  |

FIG. 5

AUTONOMIC STRING-MANIPULATION SYSTEM

CROSS-REFERENCE TO RELATED APPLICATIONS

This is a continuation of application Ser. No. 674,658, filed Apr. 7, 1976.

No cross-references to related applications. Reference is hereby made to a related Disclosure Document entitled "Autonomic String-Manipulation System," No. 045773, filed on Dec. 29, 1975.

BRIEF SUMMARY OF INVENTION

Background

The present invention is in the field of data processing, and in the subfield of artificial or machine intelligence. It has become customary in the art to view computing machines broadly as symbol-manipulation devices. Normally, symbols arranged in some initial structural configuration (often strings, or data-structures reducible to strings) are input to a computing system and manipulated according to some well-defined and well-sequenced instructions (program) into some other, sought-after, configuration of symbols, constituting the output or result. Given an input configuration, the preparation of a program to achieve a desired end-result is usually a premeditated task, involving an objective or goal, intention, design, and other volitional and intelligent activities of a human programmer.

The present invention is likewise concerned with symbol-manipulation, and, in particular, with the manipulation of representations of finite strings of arbitrary symbols. However, the basic system has no programming capabilities (at least in the sense described above), and, regardless of the type of input, the same type of manipulation is applied in a blind, purposeless, and primitive fashion. At the most basic level the system has no prior knowledge of its environment, and its basic capability is discriminating between adjacent symbols as being distinct or indistinct, and recording the results of such discrimination in an internal code of four letters. The system is not concerned with external symbols qua symbols, and therefore no internal description or explicit recognition of these is necessary. Consequently, the system can handle any external symbols whatsoever, including (albeit indirectly) strings of "symbols" having no physical representation, referred to as fantomarks. Since all inputs are virtually unknown in advance of processing, no particular objectives can be specified for the system's string-manipulation activity, and no program is prepared or utilized. It is clear that this mode of symbol- or string-manipulation is extremely primitive, and, while there is a trivial element of programmability in the small, the activity is definitely not programmed in the large. Namely, nothing embedded in the specification of this primitive activity can be construed as designed or intended to produce any particular global patterns or results. The ability of an automatic symbol-manipulation system to produce unexpected global results (which are not trivial, and are "meaningful" or "useful"), strictly on the basis of local, myopic, primitive, and purposeless manipulation of symbols, is referred to in this invention as "autonomic processing."

It turns out that the system, operating in an automatic mode of processing, transforms any input string into a DNA-like structure and retains this structure indefinitely in a self-created mode of memory. The processing activity itself, when looked at carefully and analyzed in the large, displays features of classical dialectical activity, in effect mimicking Hegelian dialectic with uncanny fidelity. Since Hegelian and other dialectical tenets are so central to philosophical speculation about the nature of thought processes, and since, obviously, the activity is not programmed or designed in that direction but, as it were, makes the connection on its own accord, it appears that the activity captures some underlying aspects of natural thought processes, and could be used in conjunction with problems in the field of artificial intelligence. This invention can be utilized in the areas of pattern recognition, concept formation, logical abduction, and other machine intelligent tasks.

Summary

The present invention is concerned with string-manipulation, including operations on strings, processes defined in terms of said operations, devices that embody said processes, and combinations, or interactions, of said processes and devices with conventional data processing systems to effect certain useful processing of data.

String-manipulation operations on whole strings are the basic ingredients of the system disclosed hereinafter. The level and function of these operations are comparable to those of machine operations and instruction sets in conventional data processing systems. The operations disclosed are classified as primary, including Interface Tetracoding (ITC), Tetracoding (TTC), Triunation (TRI), Lagging (LAG), and Wagging (WAG); and auxiliary, including Streaking (STR), Reclamation (REC), Bicoloring (BIC), Amination (AMN), Deamination (DMN), and four types of Ideographing (IDA, IDB, IDC, and IDD). The primary operations are closely related and are functionally equivalent, when augmented by the proper auxiliary operations. String-manipulation systems defined by them are subsumed under Post's monogenic normal systems which are known to be very powerful computationally. The auxiliary operations essentially perform certain translations between the primary modes, and ideographing operations generate ideographic representations of internal strings (tetracodes) for output and display purposes. The primary operations, aided by the auxiliary, form a basis for a powerful string-manipulation system, expressible in a sort of higher-level calculus of operations, that can be used effectively to define and carry out processes of industrial utility.

The most important process is Basic Intellector Process (BIP), which amounts to indefinite tetracoding (after a suitable interfacing) of the successors of a given string. Features of BIP processing include: autonomic mode of processing; generation of tetracodes belonging to a substrate tree; operative dialectric and manifested (structural) dialectric; automatic mode of memory; and automatic error-correction. BIP has numerous variations that are essentially functionally equivalent to it. Such variations are generically called "hegelizing processes," and $BIP_s$, which amounts to indefinite triunation of the streak of a given string and its successors, is such a process. A preferred hardware embodiment, in terms of logic design diagram for electronic circuitry, of TRI and $BIP_s$ is completely specified and is referred to as INTELLECTOR. A single INTELLECTOR, or a plurality of INTELLECTORs, can be connected to other digital systems, including digital data processing means, and, in particular, to a control section of a digital computer system having memory and control sections;

such combinations having the advantages of both the autonomic string-manipulation system inherent in INTELLECTORs, and the programmability of conventional digital computer systems.

DESCRIPTION OF THE DRAWINGS

FIG. 4 comprises FIGS. 4A, 4B, 4C, 4D, and 4E and shows a trace of an example of BIP processing written in the internal alphabet (FIG. 4A); and in ideographic representations type IDA (FIG. 4B), type IDB (FIG. 4C), type IDC (FIG. 4D), and type IDD (FIG. 4E).

FIG. 5 shows a trace of an example of BIP processing written in the internal alphabet.

DETAILED DESCRIPTION

Introduction, Definitions, and Basic Terminology

Figure 1:
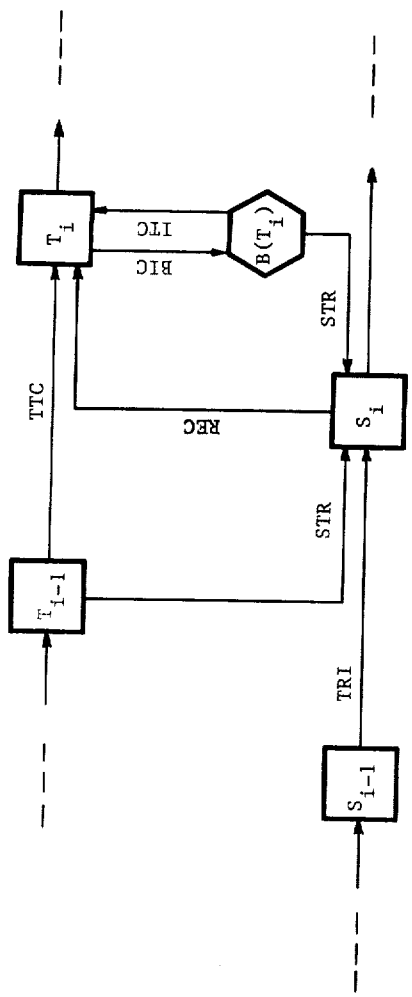
FIG. 1 illustrates diagramatically relationships among the operations TIC, TRI, STR, REC, ITC, and BIC.

The present invention is concerned with string-manipulation. More specifically, a "string," conisting of individual "elements," is a linear arrangement of said elements. The "length" of a string is the number of elements in the linear arrangement. A string of length n is said to be "n units long." A "substring" of a string of length n is any portion thereof of length m, for $1 \leq m \leq n$. All strings herein are of finite length, or simply "finite," and normally (but not necessarily) are at least three units long. Given a string, an element at one of its ends is referred to as "leftmost" or "first" element. The element next to the first is said to be on its "right" and called "second" element, and so on, until the rightmost element, referred to as "last" element. In addition, the first element is deemed to have a special empty or "blank" element on its left, and the last element is deemed to have a blank element on its right. Blank elements do not contribute units to the length of a string, and, normally, no blank elements appear between the first and the last elements. A string, together with its blank elements, is referred to as "closed," and without them as "open." A string is deemed to be closed unless specifically referred to as open. Each element in the open portion of a closed string has a "left-neighbor," i.e., the element immediately to its left, and, likewise, a right-neighbor; the first and last elements having a blank left-neighbor and a blank right-neighbor, respectively.

No restriction is placed on the nature, character, or substance of elements in the open portion of a string. If an element is represented symbolically by a sign or a mark, the mark is considered an element in its own right and any meanings or other significative aspects of the mark, including its semiotic relationship to the original element, need not be considered any further. The terms "symbol" or "mark" are used generically to denote standard semiotic terms, such as sign, icon, index, token, character, ideograph, and the like. An element that can be prehended or sensed or recorded by human beings, and/or other living things or systems, and/or instruments, devices, or systems made by human beings, is referred to as objective element or "datum-object." An element that cannot be prehended, sensed, or recorded by any of said means is referred to as "fantomark." A string comprising elements which are not datum-objects is referred to as "fantomark string." Marks and symbols are considered to datum-objects, and, normally, strings herein are strings of marks or symbols, or their physical representations, such as in terms of bit-signal patterns.

In the present invention a mark is normally considered only in the context of a string, namely in the context of other marks, including blanks; consequently, marks are reduced to essentially syncategorematic entities, or even weaker. When marks are taken individually or even in combination, any meanings, significations, or other semiotic properties are normally disregarded. A mark is normally considered in terms of its relations to its two neighbors, a "relation" taken to be binary distinction/indistinction; namely, a mark is said to be "distinct" from a neighbor if it is distinguishable from the neighbor (by some comparison means); otherwise it is said to be "indistinct" from the neighbor. Clearly a relation between two marks is symmetric, or mutual. The essential information in a mark string (or any string), from the point of view of the present invention, is the totality of mutual relations of elements in the string. This information can be encoded in a number of ways which are essentially equivalent, or commutable into each other, and thus reducible to a single encoding method. The two techniques below, describing "streaking" and "tetracoding," disclose the essence of said encoding.

The "streak" of a string is a binary string, i.e., a string having at most two types of marks such as '0' and '1', that encodes the mutual relations of elements in the former string in the following manner: for each element, but the first, in the open portion of said string, if it is distinct from its left-neighbor the corresponding code in the streak is 0; otherwise it is 1. In addition, a 0 is appended to each end of the code sequence. A streak without the appended 0's is referred to as "bare" streak.

The "tetracode" of a string is a mark string that encodes the mutual relations of elements in the original string in the following manner: for each element in the open portion of the original string, if both neighbors are distinct from it the corresponding code is a mark 'A'; if the left-neighbor is distinct and the right-neighbor is indistinct from it the corresponding code is a mark 'B'; if the left-neighbor is indistinct and the right-neighbor is distinct from it the corresponding code is a mark 'C'; and if both neighbors are indistinct from it the corresponding code is a mark 'D'. The set of marks consisting of A, B, C, and D is referred to as "internal alphabet," and the marks are sometimes referred to as "letters." Ideographic symbols may be substituted for the letters, for example: ☐ for A; ⊏ for B; ⊐ for C; and ═ for D.

A method of generating streaks of mark strings is referred to as "streaking method" and the transformational operation involved is referred to as "streaking"; likewise, a method of generating tetracodes is referred to as "tetracoding method" and the operation as "tetracoding." The notions of streaking and tetracoding apply to all datum-object strings.

Fantomark strings which, by definition, are imperceptible to man, animal, or machine may nevertheless have well-defined streaks, which are ordinary mark strings. This invention is not concerned with methods of generating streaks of fantomark strings; however, it includes methods of processing streaks of fantomark strings, if such are presented for processing, in the same manner as any other streaks.

The present invention is concerned with operations on strings, with processes defined in terms of said operations, with devices that embody said processes, and with combinations, or interactions, of said processes and devices with conventional data processing systems to effect certain useful processing of data.

String-Manipulation Operations

String-manipulation operations on whole strings are the basic ingredients of the system herein disclosed. The level and function of these operations are comparable to those of machine operations and instruction sets in conventional data processing systems. All string-manipulation operations are "unary," i.e., operate on a single string, the "operand." Normally an operation includes a set of rewriting rules (or productions) out of which a rule is selected and applied to each mark in the operand in the course of application of the operation. Most rewriting rules are context-sensitive, namely intrinsically selected for application to a given mark on the basis of its local context. Context-sensitive rewriting rules are written in the format: X→U/Y-Z, meaning that "the mark X is to be rewritten as the mark U if X is in the context of the mark Y and the mark Z, on its left and right, respectively." Other standard, or self-explanatory, formats for rewriting rules and productions are used, as needed. An operation involving simultaneous applications of rewriting rules to all marks in the operand is referred to as "parallel"; and the simultaneous acts are collectively referred to as transformational step, or "step." (Provided that any use of the work 'step' in claims included in this application is not governed by this definition.) An operation involving sequential application of rewriting rules, such as from the leftmost to the rightmost mark, is referred to as "sequential." A sequential transformational step comprises, temporally and functionally, the sequence of individual substeps involved in the application of the sequential operation. An operation that is not parallel and not strictly sequential is referred to as "scrambled." Most operations herein disclosed are parallel and some are sequential. It is obvious to persons skilled in the art that all parallel operations can be converted into sequential, or even scrambled, operations without altering their essential character. A string resulting from application of a string-manipulation operation to an operand is referred to as "result" or (immediate) "successor," and the operand is referred to as (immediate) "predecessor" of the successor. In the specifications of operations that follow this paragraph, "input string" is synonymous with operand or predecessor; and "output string" is synonymous with result or successor. A string-manipulation operation is referred to as "monogenic," if its application to an operand yields at most one successor; (note that the number of predecessors yielding the same successor under same monogenic operation is not restricted to one). All operations herein disclosed are monogenic. Some operations apply to arbitrary strings, some apply to any string but normally are applied to a limited class of strings, and some apply to a restricted class only. For notational convenience, strings are designated by the following types and notations. Q designates any type of string; R designates any "raw-data string," namely any datum-object string initially external to the system, that is submitted to the system for processing; S designates any streak; T designates any tetracode; and B designates any bicolored string; (said type of string is described in the specification of the bicoloring operation). The tetracode and streak of a string Q are written T(Q) and S(Q), respectively. Subscripts are used to distinguish between two or more strings of the same type. Lowercase versions of the respective capital letters, with proper subscripts, designate individual elements in strings; (in a few places Greek letters are used for this purpose). A blank is designated by ' ʙ ' and the position of a leftmost blank normally receives '0' subscript. Operations are assigned names and shorter mnemonic designations in three capital letters. If 'OPR' is the generic mnemonic for operations, a single application of OPR to Q is written OPR(Q); k successive applications of OPR to Q and its k-1 successors are written $OPR^k(Q)$ if k is finite, and $OPR^\infty(Q)$ if k is indefinite. Application of $OPR_i$ to the successor of Q under $OPR_j$ is written $OPR_i(OPR_j(Q))$, and this notation is extended to any number of applications of various operations, as needed. The notations '≠' and '=' designate the phrases "distinct from" and "indistinct from," respectively. The specifications of string-manipulation operations are disclosed and set forth below.

Operation Name:
Interface Tetracoding
Mnemonic:
ITC
Type:
unary, parallel
Input String:
Type: R
Alphabet: (any datum-object)
Length: n
Format: ʙ $r_1 r_2 \ldots r_i \ldots r_n$ ʙ

$(r_0 = r_{n+1} = \text{ })$

Rewriting Rules:
(1) $r_i \rightarrow A/r_{i-1} - r_{i+1}$, if $r_i \neq r_{i-1}$ and $r_i \neq r_{i+1}$;
(2) $r_i \rightarrow B/r_{i-1} - r_{i+1}$, if $r_i \neq r_{i-1}$ and $r_i = r_{i+1}$;
(3) $r_i \rightarrow C/r_{i-1} - r_{i+1}$, if $r_i = r_{i-1}$ and $r_i \neq r_{i+1}$;
(4) $r_i \rightarrow D/r_{i-1} - r_{i+1}$, if $r_i = r_{i-1}$ and $r_i = r_{i+1}$; for $1 \leq i \leq n$.

Output String:
Type: T
Alphabet: {A,B,C,D}
Length: n
Format: ʙ $t_1 t_2 \ldots t_i \ldots t_n$ ʙ

$(t_0 = t_{n+1} = \text{ʙ})$

EXAMPLE

Input String: 'BEGINNING'
Length: 9
ITC(BEGINNING)=AAABCAAA
Result above is obtained by parallel applications of rewriting rules (1), (1), (1), (1), (2), (3), (1), (1), and (1) to B, E, G, I, N, N, I, N, and G, respectively.

Operation Name:
Tetracoding
Mnemonic:
TTC
Type:
unary, parallel
Input String:
Type: $T_k$
Alphabet: {A,B,C,D}
Length: n Format: ⊬ $t_{k1}$ $t_{k2}$ ... $t_{ki}$ ... $t_{kn}$ ⊬

($t_{k0} = t_{kn+1} = $ ⊬ )

Rewriting Rules:
  Same as for ITC. The explicit form of the rewriting rules, in terms of the internal alphabet, is given below.

| (01) A → D/A−A | (17) A → B/B−A | (33) A → B/C−A | (49) A → B/D−A |
|---|---|---|---|
| (02) A → C/A−B | (18) A → A/B−B | (34) A → A/C−B | (50) A → A/D−B |
| (03) A → C/A−C | (19) A → A/B−C | (35) A → A/C−C | (51) A → A/D−C |
| (04) A → C/A−D | (20) A → A/B−D | (36) A → A/C−D | (52) A → A/D−D |
| (05) B → A/A−A | (21) B → C/B−A | (37) B → A/C−A | (53) B → A/D−A |
| (06) B → B/A−B | (22) B → D/B−B | (38) B → B/C−B | (54) B → B/D−B |
| (07) B → A/A−C | (23) B → C/B−C | (39) B → A/C−C | (55) B → A/D−C |
| (08) B → A/A−D | (24) B → C/B−D | (40) B → A/C−D | (56) B → A/D−D |
| (09) C → A/A−A | (25) C → A/B−A | (41) C → C/C−A | (57) C → A/D−A |
| (10) C → A/A−B | (26) C → A/B−B | (42) C → C/C−B | (58) C → A/D−B |
| (11) C → B/A−C | (27) C → B/B−C | (43) C → D/C−C | (59) C → B/D−C |
| (12) C → A/A−D | (28) C → A/B−D | (44) C → C/C−D | (60) C → A/D−D |
| (13) D → A/A−A | (29) D → A/B−A | (45) D → A/C−A | (61) D → C/D−A |
| (14) D → A/A−B | (30) D → A/B−B | (46) D → A/C−B | (62) D → C/D−B |
| (15) D → A/A−C | (31) D → A/B−C | (47) D → A/C−C | (63) D → C/D−C |
| (16) D → B/A−D | (32) D → B/B−D | (48) D → B/C−D | (64) D → D/D−D |
| (65) A → B/⊬−A | (73) C → A/⊬−A | (81) A → C/A−⊬ | (89) C → A/A−⊬ |
| (66) A → A/⊬−B | (74) C → A/⊬−B | (82) A → A/B−⊬ | (90) C → A/B−⊬ |
| (67) A → A/⊬−C | (75) C → B/⊬−C | (83) A → A/C−⊬ | (91) C → C/C−⊬ |
| (68) A → A/⊬−D | (76) C → A/⊬−D | (84) A → A/D−⊬ | (92) C → A/D−⊬ |
| (69) B → A/⊬−A | (77) D → A/⊬−A | (85) B → A/A−⊬ | (93) D → A/A−⊬ |
| (70) B → B/⊬−B | (78) D → A/10−B | (86) B → C/B−⊬ | (94) D → A/B−⊬ |
| (71) B → A/⊬−C | (79) D → A/⊬−C | (87) B → A/C−⊬ | (95) D → A/C−⊬ |
| (72) B → A/⊬−D | (80) D → B/⊬−D | (88) B → A/D−⊬ | (96) D → C/D−⊬ |
| (97) A → A/⊬− | (98) B → A/⊬− | (99) C → A/ −⊬ | (100) D → A/ −⊬ |

Output String:
  Type: $T_{k+1}$
  Alphabet: {A,B,C,D}
  Length: n
  Format: ⊬ $t_{(k+1)1}$ ... $t_{(k+1)i}$ ... $t_{(k+1)n}$ ⊬

($t_{(k+1)0} = t_{(k+1)n+1} = $ ⊬ )

EXAMPLE

Input String: 'AAAABCAAA'
Length: 9
TTC(AAAABCAAA) = BDDCAABDC; length: 9
Result above is obtained by parallel applications of rewriting rules (65), (01), (01), (02), (07), (25), (33), (01), and (81) to A, A, A, A, B, C, A, A, and A, respectively.
Operation Name:
  Streaking
Mnemonic:
  STR
Type:
  unary, parallel
Input String:
  Type: R
  Alphabet: {any datum-object}
  Length: n
  Format: ⊬ $r_1$ $r_2$ ... $r_i$ ... $r_n$ ⊬ ($r_0 = r_{n+1} = $ ⊬ )
Rewriting Rules:
  (1) $r_i \to 0$, if $r_i \neq r_{i+1}$;
  (2) $r_i \to 1$, if $r_i = r_{i+1}$; for $0 \leq i \leq n$.
Output String:
  Type: S
  Alphabet: {0,1}
  Length: n+1
  Format: ⊬ $s_0$ $s_1$ ... $s_i$ ... $s_{n-1}$ $s_n$ ⊬ ($s_0 = s_n = 0$; $s_{-1} = s_{n+1} = $ ⊬ )

EXAMPLE

Input String: 'AAAABCAAA'
Length: 9
STR( AAAABCAAA ) = 0111000110; length: 10
Result above is obtained by parallel applications of rewriting rules (1), (2), (2), (2), (1), (1),(1), (2), (2), and (1) to ⊬, A, A, A, A, B, C, A, A, and A, respectively.

The bare streak is: 11100011; length: 8
Operation Name:
  Triunation
Mnemonic:
  TRI
Type:
  unary, parallel
Input String:
  Type: S($T_k$)
  Alphabet: {0,1}
  Length: n+1; (bare length: n−1)
  Format: ⊬ $s_0$ $s_1$ ... $s_i$ ... $s_{n-1}$ $s_n$ ⊬ ($s_0 = s_n = 0$; $s_{-1} = s_{n+1} = $ ⊬ )
Rewriting Rules:
  (1) $s_i \to 1/s_{i-1} - s_{i+1}$, if $s_i = s_{i-1}$ and $s_i = s_{i+1}$;
  (2) $s_i \to 0/s_{i-1} - s_{i+1}$, if $s_i \neq s_{i-1}$ and/or $s_i \neq s_{i+1}$; for $1 \leq i \leq n-1$;
  (3) $s_0$ and $s_n$ remain = 0.
Output String:
  Type: S($T_{k+1}$)
  Alphabet: {0,1}
  Length: n+1; (bare length: n−1)
  Format: as above

EXAMPLE

Input String: '0111000110'
Length: 10
TRI(0111000110) = 0010010000; length: 10
Result above is obtained by parallel applications of rewriting rules (3), (2), (1), (2), (2), (1), (2), (2), (2), and (3) to 0, 1, 1, 1, 0, 0, 0, 1, 1, and 0, respectively.
Operation Name:
  Reclamation
Mnemonic:
  REC
Type:

unary, parallel
Input String:
 Type: S
 Alphabet: {0,1}
 Length: n+1; (bare length: n−1)
 Format: ⊬ $s_0 s_1 \ldots s_i \ldots s_{n-1} s_n$ ⊬ ($s_0 = s_n = 0$; $s_{-1} = s_{n+1} =$ ⊬ )
Rewriting Rules:
 (1) $s_i s_{i+1} \rightarrow A$, if $s_i = 0$ and $s_{i+1} = 0$;
 (2) $s_i s_{i+1} \rightarrow B$, if $s_i = 0$ and $s_{i+1} = 1$;
 (3) $s_i s_{i+1} \rightarrow C$, if $s_i = 1$ and $s_{i+1} = 0$;
 (4) $s_i s_{i+1} \rightarrow D$, is $s_i = 1$ and $s_{i+1} = 1$; for $0 \leq i \leq n-1$.
Output String:
 Type: T
 Alphabet: {A,B,C,D}
 Length: n
 Format: ⊬ $t_1 t_2 \ldots t_i \ldots t_n$ ⊬ ($t_0 = t_{n+1} =$ ⊬ )

EXAMPLE

Input String: '0111000110'
Length: 10
REC(0111000110) = BDDCAABDC; length: 9
Result above is obtained by parallel applications of rewriting rules (2), (4), (4), (3), (1), (1), (2), (4), and (3) to 01, 11, 11, 10, 00, 00, 01, 11, and 10, respectively.
Operation Name:
 Bicoloring
Mnemonic:
 BIC
Type:
 unary, sequential
Input String:
 Type: T
 Alphabet: {A,B,C,D}
 Length: n
 Format: ⊬ $t_1 t_2 \ldots t_i \ldots t_n$ ⊬ ($t_0 = t_{n+1} =$ ⊬ )
Rewriting Rules:
 (1) $t_1 \rightarrow 0$, if $t_1 = A$ or $t_1 = B$;
 (2) $t_i \rightarrow b_{i-1}$, if $t_{i-1} = B$ or $t_{i-1} = D$;
 (3) $t_i \rightarrow \sim b_{i-1}$, if $t_{i-1} = A$ or $t_{i-1} = C$; for $2 \leq i \leq n$;
 where $b_{i-1}$ is the color-value assigned to $t_{i-1}$, i.e., 0 or 1, and $\sim b_{i-1}$ is the color-value opposite to the one assigned to $t_{i-1}$.
Output String:
 Type: B
 Alphabet: {0,1}
 Length: n
 Format: ⊬ $b_1 b_2 \ldots b_i \ldots b_n$ ⊬

EXAMPLE

Input String: 'AAAABCAAA'
Length: 9
BIC(AAAABCAAA) = 010100101
Result above is obtained by sequential application of rewriting rules (1), (3), (3), (3), (3), (2), (3), (3), and (3) to A, A, A, A, B, C, A, A, and A, respectively.
Operation Name:
 Lagging
Mnemonic:
 LAG
Type:
 unary, sequential
Input String:
 Type: S
 Alphabet: {0,1}; (modified alphabet: {0,1,α})
 Length: n+1; (bare length: n−1)
 Format: ⊬ $s_0 s_1 \ldots s_i \ldots s_{n-1} s_n$ ⊬ ($s_0 = s_n = \alpha$, α is a marker; $s_{-1} = s_{n+1} =$ ⊬ )

Operation Description & Rewriting Rules:
 Starting at $s_0$, the three leftmost symbols uniquely determine a rewriting rule from the set below that specifies a symbol $\epsilon$ {0,1,α} to be appended to the R.H.S. of the string; the leftmost symbol is dropped and same is repeated until $s_{n-1}$ is dropped, which completes one transformational operation on the entire string. The general format of the rewriting rules is:
 $s_{i-1} s_i s_{i+1} \rightarrow 0$ or 1 or α, depending on triplet on L.H.S.; for $1 \leq i \leq n$. The explicit rewriting rules are:

| $L_1$: 000 → 1 | $L_9$: α00 → 1 | $L_{13}$: 0α0 → α | $L_{17}$: 00α → 1 |
| $L_2$: 001 → 0 | $L_{10}$: α01 → 0 | $L_{14}$: 0α1 → α | $L_{18}$: 01α → 0 |
| $L_3$: 010 → 0 | $L_{11}$: α10 → 0 | $L_{15}$: 1α0 → α | $L_{19}$: 10α → 0 |
| $L_4$: 011 → 0 | $L_{12}$: α11 → 0 | $L_{16}$: 1α1 → α | $L_{20}$: 11α → 0 |
| $L_5$: 100 → 0 | | | |
| $L_6$: 101 → 0 | | | |
| $L_7$: 110 → 0 | | | |
| $L_8$: 111 → 1 | | | |

Output String:
 Type: S (in LAG-mode)
 Alphabet: {0,1,α}
 Length: n+1; (bar length: n−1)
 Format: ⊬ $\beta s_i \ldots s_i \ldots s_{n-1} \alpha$ ⊬

EXAMPLE

Input String: '0001000000'; in LAG-mode: 'α0010000α'
Length: 10
LAG(α00100000α) = α100011 1 1α
Result above is obtained by sequential application of rewriting rules $L_9$, $L_2$, $L_3$, $L_5$, $L_1$, $L_1$, $L_1$, $L_{17}$, and $L_{14}$ to α00, 001, 010, 100, 000, 000, 000, 00α, and 0α1, respectively.
Operation Name:
 Amination
Mnemonic:
 AMN
Type:
 unary, sequential
Input String:
 Type: S (in LAG-mode)
 Alphabet: {0,1,α}
 Length: n+1; (bare length: n−1)
 Format: ⊬ $\alpha s_1 \ldots s_i \ldots s_{n-1} \alpha$ ⊬ ($s_0 = s_n = \alpha$)
Operation Description & Rewriting Rules:
 Starting at $s_0$, the three leftmost symbols uniquely determine a rewriting rule from the set below that specifies a symbol $\epsilon$ {$N_1, N_2, \ldots, N_{20}$} which becomes a symbol in the new string; the leftmost symbol is dropped and same is repeated until $s_{n-2}$ is dropped. The new string thus comprises n−1 $N_j$'s in the order of their production. The general format of the rewriting rules is:
 $s_{i-1} s_i s_{i+1} \rightarrow N_j$, $1 \leq j \leq 20$, depending on triplet on L.H.S.; for $1 \leq i \leq n-1$. The explicit rewriting rules are:

| (1) 000 → $N_1$ | (9) α00 → $N_9$ | (13) 0α0 → $N_{13}$ | (17) 00α → $N_{17}$ |
| (2) 001 → $N_2$ | (10) α01 → $N_{10}$ | (14) 0α1 → $N_{14}$ | (18) 01α → $N_{18}$ |
| (3) 010 → $N_3$ | (11) α10 → $N_{11}$ | (15) 1α0 → $N_{15}$ | (19) 10α → $N_{19}$ |
| (4) 011 → $N_4$ | (12) α11 → $N_{12}$ | (16) 1α1 → $N_{16}$ | (20) 11α → $N_{20}$ |
| (5) 100 → $N_5$ | | | |
| (6) 101 → $N_6$ | | | |
| (7) 110 → $N_7$ | | | |

(8) 111 → $N_8$

Output String:
  Type: AMN(S) (bare)
  Alphabet: $\{N_1, \ldots, N_{20}\}$ and same is repeated until $v_{n-1}$ is dropped and then the first appended symbol is dropped, which completes one transformational operation on the string. The general format of the rewriting rules is:

$v_i \$ v_{last} \rightarrow N_j$, $1 \leq j \leq 20$, depending on $v_i$ and $v_{last}$, where $ is any substring; for $1 \leq i \leq n-1$. The explicit rewriting rules are:

| | | | |
|---|---|---|---|
| $W_1: N_1\$N_1 \rightarrow N_2$ | $W_9: N_1\$N_9 \rightarrow N_2$ | $W_{13}: N_1\$N_{13} \rightarrow N_{10}$ | $W_{17}: N_1\$N_{17} \rightarrow N_{14}$ |
| $W_2: N_1\$N_2 \rightarrow N_4$ | $W_{10}: N_1\$N_{10} \rightarrow N_4$ | $W_{14}: N_1\$N_{14} \rightarrow N_{12}$ | $W_{18}: N_1\$N_{18} \rightarrow N_{16}$ |
| $W_3: N_1\$N_3 \rightarrow N_6$ | $W_{11}: N_1\$N_{11} \rightarrow N_6$ | $W_{15}: N_1\$N_{15} \rightarrow N_{10}$ | $W_{19}: N_1\$N_{19} \rightarrow N_{14}$ |
| $W_4: N_1\$N_4 \rightarrow N_8$ | $W_{12}: N_1\$N_{12} \rightarrow N_8$ | $W_{16}: N_1\$N_{16} \rightarrow N_{12}$ | $W_{20}: N_1\$N_{20} \rightarrow N_{16}$ |
| $W_5: N_1\$N_5 \rightarrow N_2$ | | | |
| $W_6: N_1\$N_6 \rightarrow N_4$ | | | |
| $W_7: N_1\$N_7 \rightarrow N_6$ | | | |
| $W_8: N_1\$N_8 \rightarrow N_8$ | | | |

NOTE:
If, in rewriting rules $W_1$ through $W_{20}$, the first symbol $N_1$ is uniformly replaced by any of the symbols $N_8$, $N_9$, or $N_{17}$, the same rules apply to these symbols, respectively.

| | | | |
|---|---|---|---|
| $W_{21}: N_2\$N_1 \rightarrow N_1$ | $W_{29}: N_2\$N_9 \rightarrow N_1$ | $W_{33}: N_2\$N_{13} \rightarrow N_9$ | $W_{37}: N_2\$N_{17} \rightarrow N_{13}$ |
| $W_{22}: N_2\$N_2 \rightarrow N_3$ | $W_{30}: N_2\$N_{10} \rightarrow N_3$ | $W_{34}: N_2\$N_{14} \rightarrow N_{11}$ | $W_{38}: N_2\$N_{18} \rightarrow N_{15}$ |
| $W_{23}: N_2\$N_3 \rightarrow N_5$ | $W_{31}: N_2\$N_{11} \rightarrow N_5$ | $W_{35}: N_2\$N_{15} \rightarrow N_9$ | $W_{39}: N_2\$N_{19} \rightarrow N_{13}$ |
| $W_{24}: N_2\$N_4 \rightarrow N_7$ | $W_{32}: N_2\$N_{12} \rightarrow N_7$ | $W_{36}: N_2\$N_{16} \rightarrow N_{11}$ | $W_{40}: N_2\$N_{20} \rightarrow N_{15}$ |
| $W_{25}: N_2\$N_5 \rightarrow N_7$ | | | |
| $W_{26}: N_2\$N_6 \rightarrow N_3$ | | | |
| $W_{27}: N_2\$N_7 \rightarrow N_5$ | | | |
| $W_{28}: N_2\$N_8 \rightarrow N_7$ | | | |

NOTE:
If, in rewriting rules $W_{21}$ through $W_{40}$, the first symbol $N_2$ is uniformly replaced by any of the symbols $N_3$, $N_4$, $N_5$, $N_6$, $N_7$, $N_{10}$, $N_{11}$, $N_{12}$, $N_{18}$, $N_{19}$, or $N_{20}$, the same rules apply to these symbols, respectively.

| | | |
|---|---|---|
| $W_{41}: N_{13}\$N_1 \rightarrow N_{17}$ | $W_{49}: N_{13}\$N_9 \rightarrow N_{17}$ | |
| $W_{42}: N_{13}\$N_2 \rightarrow N_{18}$ | $W_{50}: N_{13}\$N_{10} \rightarrow N_{18}$ | (Combinations of $N_{13}$ with $N_{13}$ |
| $W_{43}: N_{13}\$N_3 \rightarrow N_{19}$ | $W_{51}: N_{13}\$N_{11} \rightarrow N_{19}$ | through $N_{20}$ cannot occur in |
| $W_{44}: N_{13}\$N_4 \rightarrow N_{20}$ | $W_{52}: N_{13}\$N_{12} \rightarrow N_{20}$ | this system) |
| $N_{45}: N_{13}\$N_5 \rightarrow N_{17}$ | | |
| $W_{46}: N_{13}\$N_6 \rightarrow N_{18}$ | | |
| $W_{47}: N_{13}\$N_7 \rightarrow N_{19}$ | | |
| $W_{48}: N_{13}\$N_8 \rightarrow N_{20}$ | | |

NOTE:
If, in rewriting rules $W_{41}$ through $W_{52}$, the first symbol $W_{13}$ is uniformly replaced by any of the symbols $N_{14}$, $N_{15}$, or $N_{16}$, the same rules apply to these symbols, respectively.

Length: $n-1$
Format: ⊬ $v_1 v_2 \ldots v_i \ldots v_{n-1}$ ⊬ ($v_i \epsilon \{N_1, \ldots, N_{20}\}$)

EXAMPLE

Input String: '$\alpha 00100000 \alpha$'
Length: 10
AMN($\alpha 00100000 \alpha$) = $N_9 N_2 N_3 N_5 N_1 N_1 N_1 N_{17}$; length: 8
Result above is obtained by sequential application of rewriting rules (9), (2), (3), (5), (1), (1), (1), and (17) to $\alpha 00$, 001, 010, 100, 000, 000, 000, and $00\alpha$, respectively.
Operation Name:
  Wagging
Mnemonic:
  WAG
Type:
  unary, sequential
Input String:
  Type: AMN(S) (bare)
  Alphabet: $\{N_1, \ldots, N_{20}\}$
  Length: $n-1$
  Format: ⊬ $v_1 v_2 \ldots v_i \ldots v_{n-1}$ ⊬ ($v_i \epsilon \{N_1, \ldots, N_{20}\}$)
Operation Description & Rewriting Rules:
  Starting at $v_1$, $v_1$ together with the last $v$ in the string, determine a unique rewriting rule from the set below that specifies a symbol $\epsilon \{N_1, \ldots, N_{20}\}$ to be appended to the R.H.S. of the string; $v_1$ is dropped

EXAMPLE

Input String: '$N_9 N_2 N_3 N_5 N_1 N_1 N_1 N_{17}$'
Length: 8
WAG($N_9 N_2 N_3 N_5 N_1 N_1 N_1 N_{17}$) = $N_{11} N_5 N_1 N_2 N_4 N_8 N_8 N_{20}$
Result above is obtained by sequential application of rewriting rules $W_{17}$, $W_{34}$, $W_{31}$, $W_{25}$, $W_1$, $W_2$, $W_4$, $W_8$, and $W_{48}$ to $N_9\$N_{17}$, $N_2\$N_{14}$, $N_3\$N_{11}$, $N_5\$N_5$, $N_1\$N_1$, $N_1\$N_2$, $N_1\$N_4$, $N_{17}\$N_8$, and $N_{14}\$N_8$, respectively. Note that $N_{14}$, the first symbol produced, is later dropped and therefore does not appear in the result string.
Operation Name:
  Deamination
Mnemonic:
  DMN
Type:
  unary, parallel
Input String:
  Type: AMN(S) (bare)
  Alphabet: $\{N_1, \ldots, N_{20}\}$
  Length: $n-1$
  Format: ⊬ $v_1 v_2 \ldots v_i \ldots v_{n-1}$ ⊬ ($v_i \epsilon \{N_1, \ldots, N_{20}\}$)
Rewriting Rules:

→α and $v_i$→0 or 1, depending on $v_i$, for $1 \leq i \leq n-1$.
The explicit rewriting rules are:

| (1) $N_1 \to 0$ | (9) $N_9 \to 0$ |
|---|---|
| (2) $N_2 \to 0$ | (10) $N_{10} \to 0$ |
| (3) $N_3 \to 1$ | (11) $N_{11} \to 1$ |
| (4) $N_4 \to 1$ | (12) $N_{12} \to 1$ |
| (5) $N_5 \to 0$ | (13) $N_{17} \to 0$ |
| (6) $N_6 \to 0$ | (14) $N_{18} \to 1$ |
| (7) $N_7 \to 1$ | (15) $N_{19} \to 0$ |
| (8) $N_8 \to 1$ | (16) $N_{20} \to 1$ |

NOTE:
$N_{13}$ through $N_{16}$ cannot appear in an aminated string and no rewriting rules are given for these symbols.

Output String:
   Type: S (in LAG-mode)
   Alphabet: {0,1,α}
   Length: n+1
   Format: ƀ α $s_j$ ... $s_i$ ... $s_{n-1}$ α ƀ

EXAMPLE

Input String: '$N_{11}N_5N_1N_2N_4N_8N_8N_{20}$'
Length: 8
$DMN(N_{11}N_5N_1N_2N_4N_8N_8N_{20}) = \alpha 10001111\alpha$; length: 10; bare length: 8
Result above is obtained by parallel applications of rewriting rules (11), (5), (1), (2), (4), (8), (8), and (16) to $N_{11}$, $N_5$, $N_1$, $N_2$, $N_4$, $N_8$, $N_8$, and $N_{20}$, respectively, and by applying the rule ƀ →α at both ends.

Operation Name:
   Ideographing (four similar operations)
Mnemonics:
   IDA; IDB; IDC; IDD
Type:
   unary, parallel
Input String:
   Type: T
   Alphabet: {A,B,C,D}
   Length: n
   Format: ƀ $t_1 t_2 \ldots t_i \ldots t_n$ ƀ

| Rewriting Rules: | IDA | IDB | IDC | IDD |
|---|---|---|---|---|
| (1) A→ | □ | →– | →0 | →A |
| (2) B→ | ⊏ | →– | →1 | →D |
| (3) C→ | ⊐ | →– | →1 | →D |
| (4) D→ | = | →– | →1 | →D |
| for $1 \leq i \leq n$. | | | | |

Output String:
   Type: Ideograph
   Alphabet: { □ , ⊏ , ⊐ , = }; {–, –, –, –}; {0,1}; {A,D}
   Length: n
   Format: See FIGS. 4B, 4C, 4D, and 4E

EXAMPLE

Figures 4, 4A, 4B, 4C, 4D, 4E:
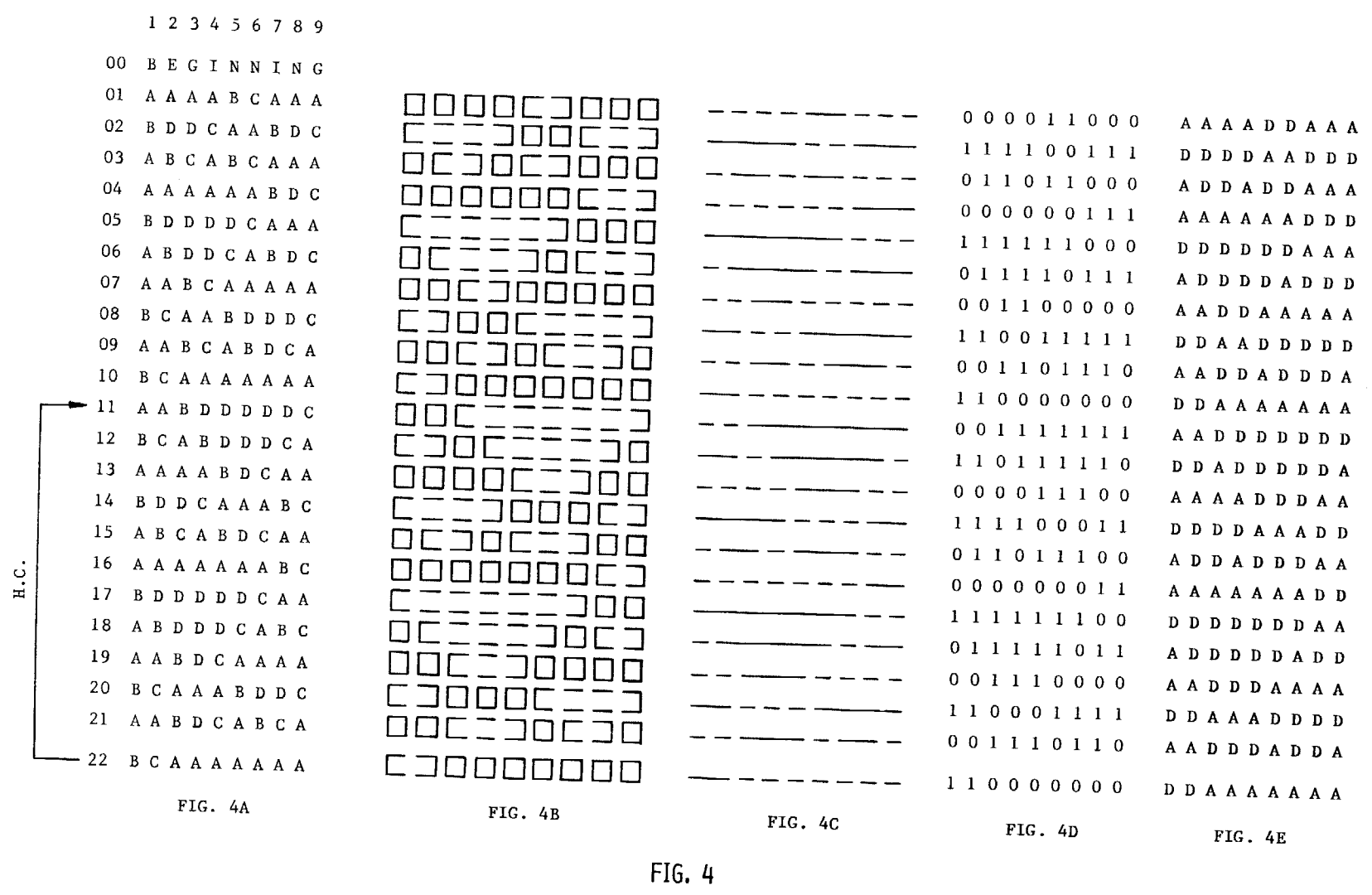

See FIG. 4
The operations set forth above are classified as primary, including ITC, TTC, TRI, LAG, and WAG; and auxiliary, including STR, REC, BIC, AMN, DMN, and IDA, IDB, IDC, and IDD. The primary operations are closely related and essentially are variations on the same theme. For example, ITC is a generic form of TTC; the former tetracodes arbitrary raw-data strings and the latter is a specialized version that tetracodes only strings written in a fixed 4-letter alphabet. TTC is considered the most important primary operation and the remaining operations will be discussed in reference to it.

ITC and STR are normally interface operations and may be subsumed under certain pre-processing operations briefly described below. Given any string Q, interfacing Q with the system or simply "interfacing Q," consists of certain pre-processing resulting in an encoding of the totality of mutual relations of elements in Q, such as the streak of Q, S(Q), or the tetracode of Q, T(Q), in a physical representation compatible with the means of further processing. If one type of encoding is thus obtained others can also be determined. For example, if S(Q) is known, T(Q)=REC(S(Q)); and if T(Q) is known, S(Q)=STR(BIC(T(Q))). The collection of all means available for pre-processing is referred to as "pre-processing means." This invention is not concerned with various technologies of pre-processing means and it is presupposed that, included in any given type of pre-processing means, there is a suitable comparison means, or equivalents thereof, for determining distinction/indistinction of elements; so that, given such comparison means, implementation of ITC or STR is straightforward. The following are examples of typical functional requirements of pre-processing means. If Q is represented in some analog mode, preprocessing means includes sensing and recording means compatible with the analog signals, and comparison means compatible with the mode of the recorded information and yielding results in a mode compatible with that of the means of further processing. In a digital technology oriented system, analog-to-digital conversion means may be included, and the comparison means may be digital. If elements in Q cannot be sensed and recorded directly, means for detecting and recording distinctions between elements, rather than the elements themselves, may be used, which recording providing the essential information for S(Q). Lastly, if streaks of fantomark strings are detected and recorded by some means, the streaks thus recorded can be further processed by the system as any other streaks.

Interrelationships among TTC, TRI, STR, REC, ITC, and BIC are illustrated diagramatically in FIG. 1. From said diagram, $$S_i = STR(T_{i-1})$$
$$= TRI(C_{i-1})$$
$$= STR(BIC(T_i)),$$

and $$T_i = TTC(T_{i-1})$$
$$= REC(S_i)$$
$$= ITC(B(T_i)).$$

TRI "shadows" TTC in the sense that, whereas $TTC(T_i)$ generates $T_{i+1}$, $TRI(S_i)$, where $S_i$ is the streak of $T_{i-1}$, generates $S_{i+1}$ which is the streak of $T_i$; (note that $S_{i+1}$ is NOT the streak of $S_i$). Since REC transforms any $S_j$ into $T_j$, TRI is functionally equivalent to TTC, when augmented by the proper auxiliary operations, or "essentially functionally equivalent" to TTC, when not so augmented. For instance, given $T_{i-1}$, $T_{i+1}$ can be generated by $TTC^2(T_{i-1})$, or by $REC(TRI(STR(T_{i-1})))$.

Hereinafter, given a streak, the nominal difference between α and 0 at the end positions in LAG and regular streak modes, respectively, shall normally be ignored; also, since a bare streak can readily be augmented with 0 at each end, it is occasionally allowed to stand for the entire streak.

TRI and LAG are also functionally equivalent, i.e., given $S_k$, $TRI(S_k) = LAG(S_k) = S_{k+1}$, where $TRI(S_k)$ is generated in parallel and $LAG(S_k)$ sequentially. In turn, LAG is functionally equivalent to WAG, when WAG is augmented by the auxiliary operations AMN and DMN according to the expression, $LAG(S_k) = DMN(WAG(AMN(S_k)))$. Finally, in relation to TTC, $T_{i+1}$ can be obtained from $T_{i-1}$ or $T_i$ in a number of ways, including the following, $$\begin{aligned} T_{i+1} &= TTC(T_i) \\ &= REC(TRI(STR(T_{i-1}))) \\ &= REC(TRI(STR(BIC(T_i)))) \\ &= REC(LAG(STR(T_{i-1}))) \\ &= (REC(DMN(WAG(AMN(STR(T_{i-1})))))); \end{aligned}$$

so that the function of TTC can be served by TRI, LAG, or WAG, when augmented by the proper auxiliary operations, as specified above.

The additional variations of TTC, through TRI, LAG, and WAG may seem superfluous but are, in fact, essential to the definition of scope of this invention. The importance of TRI will be brought out later in connection with a certain device embodiment of this invention. The basic roles of LAG and WAG are discussed below.

The lagging operation defines, what is called in the literature, a lag system with prefix number $\beta = 3$, and suffix number $\epsilon = 1$; (see Nao Wang, "Tag Systems and Lag Systems," Math. Annalen (1963) 65–74; also, N. Wang, "Remarks on Machines, Sets, and the Decision Problem," in "Formal Systems and Recursive Functions," J. N. Crossley and M. A. E. Dummett (eds.), North-Holland Publishing Co., 1965, p. 304–320). The present link to Wang's lag systems is particularly important because these systems, in turn, are related to Post's tag systems, and, in fact, coincide with them when both types have prefix number = 1. The present wagging operation which is basically derived from the lagging operation, defines a "wag system" with prefix number $\eta 1$, which lies somewhere between lag and tag systems. All three types are subsumed under Post's monogenic normal systems which are known to be very powerful computationally; for instance, Minsky has shown that "computability with monogenic normal systems is equivalent to computability with general-recursive functions, Turing machines, general canonical systems, etc." (see Marvin Minsky, "Computation: Finite and Infinite Machines," Prentice-Hall, 1967, p. 270). In addition to indicating the level of computational power inherent in the wag systsm herein disclosed (and, in turn, in TTC and systems derivable from TTC), it is stressed that the wag system is defined herein essentially in the formalism of a Post canonical system. Now Emil Post has shown in his celebrated 1943 paper ("Formal Reduction of the General Combinatorial Decision Problem," Am. J. Math., 65, 197–215 (1943)) that any formal system can be reduced to a Post canonical system with a single axiom and only productions of the simple form g$→$h; (see Minsky's reference above, p. 240). Since the formalism of the primary operations (through WAG) is reduced to the accepted standard of Post canonical form, the point is made that the derived string-manipulation method disclosed hereinafter conclusively anticipates any and all methods which are functionally equivalent to it.

The auxiliary operations essentially perform certain translations between the primary modes. Certain basic uses of STR, REC, AMN, DMN, and BIC are demonstrated earlier. Note that BIC is a kind of inverse of REC, namely, given $T_i$, $S_\eta STR(BIC(T_i))$. IDA, IDB, IDC, and IDD generate ideographic representations of tetracodes for output and display purposes. IDD is used also in connection with the process of abduction discussed elsewhere.

The primary operations, aided by the auxiliary, form a basis for a powerful string-manipulation system, expressible in a sort of higher-level calculus of operations, that can be used effectively to define and carry out certain processes of industrial utility.

Processes & Processing

This section contains the nucleus of the present invention, namely, Basic Intellector Process (BIP). Because of the diversity of topics included in this section, an informal brief outline is given below.

The notions of process and processing are introduced first, followed by a discussion of quids and quods, the fundamental constituents of tetracodes, and certain processes applicable to them. BIP is introduced as a natural extension of said processes, followed by detailed analysis and discussion of the properties and behaviour of BIP processing, including the following topics: autonomic mode of BIP processing; the tetracode space; operative dialectic and the Hegelian connection; manifested dialectic; two concrete examples of BIP processing; autonomic error-correction; and functional equivalents of BIP.

Let a set of p operations ($OPR_1$, $OPR_2$, ..., $OPR_P$) be given, and let Q be any string. A "process of degree m" applied to Q, $PROC^m\{Q\}$, consists of m applications of operations from the above set, such that the first application is to Q and each application thereafter is to the result from the application of the preceding operation. Symbolically, $PROC^m\{Q\} := OPR_{i_m}(OPR_{i_{m-1}}(\ldots(OPR_{i_1}(Q)\ldots))$, where $i_j \epsilon \{1,2,\ldots,p\}$ for $1 \leq j \leq m$, and ':=' means "is defined as." If k successive $i_j$'s are identical, for $2 \leq k \leq m$, the k successive appearances of $OPR_{ij}$ can be written as $OPR_{ij}^k$. Q is said to undergo processing to degree m by $PROC^m\{Q\}$, and the transformational activity involved is referred to as "processing of Q." A process of degree 1 is said to be "elementary." A process of degree m, m finite, is said to be "finite," and if m is unbounded or indefinite the process is said to be "indefinite." Indefinite degree is denoted by ∞. A process is said to be "monogenic" if all operations involved in it are monogenic. All processes herein disclosed are monogenic.

Hereinafter processes normally involve tetracodes, or, in the alternative, their streaks. With the aid of ideographic representations of tetracodes, (for instance, see FIG. 4B), exactly two structural types of substrings can be discerned in them, further defined as follows. A substring of a tetracode consisting of two or more A's is referred to as "quid." A quid is said to be disconnected or "discrete." A substring of a tetracode consisting of a B followed by a C, or a B followed by one or more D's followed by a C, is referred to as "quod." A quod is said to be integrated or "connected." A substring of a tetracode consisting of a single A is referred to as "monad," and may be considered as either a unitary quid or a unitary quod, depending on its history in a transformational process. (The distinction between the quidness and quodness of a monad will be elaborated later.) A quid or quod of odd or even length is referred to as "odd" or "even" quid or quod, respectively. When used in symbolic expressions a quid or quod of length k is written $QUID_k$ or $QUOD_k$, respectively, or without subscript if length is understood or irrelevant.

The "liquidation sequence" of a quod of length m is a sequence of $\mu = [m/2]$ strings, each of length m, such that the $i^{th}$ string, for $1 \leq i \leq u$, consists of a quod of length $l = m-2i$, for $m-2 \geq l \geq 0$, preceded by a substring of length i having an A in the rightmost position, and followed by a substring of length i beginning with A. A process for generating the liquidation sequence of a quod is referred to as "liquidating process," the processing involved is referred to as "liquidating," and the quod is said to be liquidated. Depending on whether a liquidated quod is even or odd, the string before last has 'BC' or 'BDC', respectively, for its residual quod, and the final liquidating step yields 'AA' or 'AAA', respectively, in the middle of the last string in the liquidation sequence. The following scheme illustrates the structure of the liquidation sequence of an even quod.

| 0 | B | D | . | . | . | . | . | D | D | D | D | . | . | . | . | . | D | C |
| 1 | A | B | D | . | . | . | . | D | D | D | D | . | . | . | . | D | C | A |
| 2 | . | A | B | D | . | . | . | D | D | D | D | . | . | . | D | C | A | . |
| 3 | . | . | A | B | D | . | . | D | D | D | D | . | . | D | C | A | . | . |
| . | | | | | | | | | | | | | | | | | | |
| . | | | | | | | | | | | | | | | | | | |
| . | | | | | | | | | | | | | | | | | | |
| $\mu-2$ | . | . | . | . | . | . | A | B | D | D | C | A | . | . | . | . | . | . |
| $\mu-1$ | . | . | . | . | . | . | . | A | B | C | A | . | . | . | . | . | . | . |
| $\mu$ | . | . | . | . | . | . | . | . | A | A | . | . | . | . | . | . | . | . |

The first process is now defined below.
Process Name:
 Liquidator
Mnemonic:
 LQD
Type:
 finite
Process Specification:
 Initial String: $QUOD_m$; $m \geq 2$
 Process: $LQD^\mu\{QUOD_m\} :\equiv TTC^\mu(QUOD_m)$, where $\mu = [m/2]$.
 Trace of
 Processing: See example below.

EXAMPLE $QUOD_7 = BDDDDDC$; $\mu = 3$
$LQD^3\{BDDDDDC\} :\equiv TTC^3(B\ D\ D\ D\ D\ D\ C)$,
which yields the liquidation sequence,
 1 A B D D D C A
 2 A A B D C A A
 3 B C A A A B C It can be seen from the above specification and example that Liquidator is a liquidating process and, in fact, liquidates a quod of length $m \geq 2$ in exactly $[m/2]$ steps. It is also observed that, during liquidating, a quod is "peeled off" or "skinned" at each end, one unit length at a liquidating step, and the two severed units appear as monads in the next string. This process continues until the entire quod has been dissolved into monads. Now, going in the other direction, viewing a quid as a collection of monads (perhaps chipped earlier from some quods), it is shown below how a quid can be integrated back into a quod.

A process transforming a quid into a quod of same length is referred to as "quodizing process," the processing involved is referred to as "quodizing," and the quid is said to be quodized. The following process quodizes quids in one step.
Process Name:
 Quodizer
Mnemonic:
 QDZ
Type:
 finite; elementary
Process Specification:
 Initial String: $QUID_m$; $m \geq 1$
 Process: $QDZ^1\{QUID_m\} :\equiv TTC(QUID_m)$
 Trace of
 Processing: See example below.

EXAMPLE $QUID_{10} = AAAAAAAAAA$
$QDZ^1\{AAAAAAAAAA\} :\equiv TTC(A\ A\ A\ A\ A\ A\ A\ A\ A\ A)$, which yields, B D D D D D D D D C I now disclose below the key process of the present invention.
Process Name:
 Basic Intellector Process
Mnemonic:
 BIP
Type:
 Indefinite
Process Specification:
 Initial String: R; length: $n \geq 1$
 Process: $BIP^\infty\{R\} :\equiv TTC^\infty(T_1)$, where $T_1 = T(R)$.
 Trace of
 Processing: See example below.

EXAMPLE

See FIG. 4A, or FIG. 5.
A finite version of BIP, namely $BIP^f\{R\} :\equiv TTC^f(T_1)$, where $T_1 = T(R)$ and f is a positive integer, is simply a finite subprocess of BIP; R is said "to undergo BIP processing to a finite degree," and BIP processing is said "to be applied to R to a finite degree."

It is obviously unobvious to predict the outcome of BIP processing, especially if the initial string is long, arbitrary, or not even known to the person attempting a prediction. In fact, at the present state-of-the-art, it would appear to persons skilled in the art as an impossibility. An important aspect of this invention is my discovery of certain general modes of internal autoregulation, effectively self-governing the outcome of any and all BIP processing, which resemble the essentially metaphysical notion of 'pre-established harmony', so favored by Leibnitz. It turns out that tetracode patterns generated by BIP processing are intricately structured, highly organized, abound with regularities and symmetries, and very significant in connection with a broad class of problems from the general area of machine intelligence. Yet, said patterns are obviously not programmed in any conventional sense, as one identifies them only after the fact, rather than specifies them in a program, scheme, or procedure beforehand; or, put another way, there is no obvious way, known at present in the art, to relate an ultra broad procedure such as $TTC^\infty(T_1)$ to the highly specific type of outcome engendered by it, or view it as "premeditated programming" of such outcome. Unusual as it may appear, the highly significant features of BIP processing, disclosed and discussed hereinafter, are not in virtue of external intent or design, but are virtually self-created through what can be ascribed only to autoregulation or autonomic processing; so much so, that the adjective 'autonomic' (in contrast to 'automatic') appearing in the title of this invention, i.e., "Autonomic String-Manipulation System," attains its rationale in this striking fact. In the following I disclose, analyze, and discuss, through supporting background and concrete examples, the properties and behaviour of BIP processing.

Inasmuch as BIP processing involves solely the generation of tetracodes, it appears useful to describe first the structure of the collection of all tetracodes of length $n \geq 1$, referred to as "tetracode space."

A string in the internal alphabet is referred to as "well-formed" (w.f.) if it consists of one or more quids and/or one or more quods arranged in any way; as "strictly well-formed" (s.w.f.) if it consists of a single quid or a single quod, or an arrangement of one or more quids and one or more quods in alternation; and as "weakly well-formed" (w.w.f.) if it is w.f. but not s.w.f. Any tetracode is w.f. and any w.f. string is a tetracode. A tetracode generated from a string which is not a tetracode may be w.w.f. or s.w.f.; a tetracode generated from a tetracode is s.w.f. For a given length n, there exist $4^n$ distinct strings in the internal alphabet; exactly $2^{n-1}$ of these are w.f., the s.w.f. form a proper subset of the w.f., and the rest are w.w.f. The number of s.w.f. strings, SWF(n), for $n>2$, can be determined from the formula, $$SWF(n) = 2 \sum_{\substack{i=2 \\ \Delta=2}}^{a_1} C\left(n - 1 - \left[\frac{i}{2}\right], i - 1\right) +$$

$$\sum_{\substack{i=1 \\ \Delta=2}}^{a_2} C\left(n - 1 - \left[\frac{i}{2}\right], i - 1\right) +$$

$$\sum_{\substack{i=1 \\ \Delta=2}}^{a_3} C\left(n - 1 - \left[\frac{i+1}{2}\right], i - 1\right),$$

where C(p,q) is a binomial coefficient, i.e., $$C(p,q) = \frac{p!}{q!(p-q)!};$$

[u] means the largest integer $\leq u$; $\epsilon = 2$ means incrementation of i by 2 at every step of the summation; and $a_1$, $a_2$, and $a_3$ are determined from the following:

(i) if n is divisible by 3, then $a_1 = (2n/3)$; $a_2 = a_3 = a_1 - 1$;
(ii) if n is odd and not divisible by 3, then $a_1 = a_2 - 1$; $a_2 = a_3 = [2n/3]$;
(iii) if n is even, then $a_1 = [2n/3]$; $a_2 = a_1 + 1$; $a_3 = a_1 - 1$.

For example, for $n=9$, $SWF(9) = 114$; compared to the $2^8 = 256$ w.f. strings (which include the 114 s.w.f. strings and 142 w.w.f. strings) and the totality of $4^9 = 262144$ arbitrary strings of length 9 that can be written in the 4-letter internal alphabet.

Figure 3:
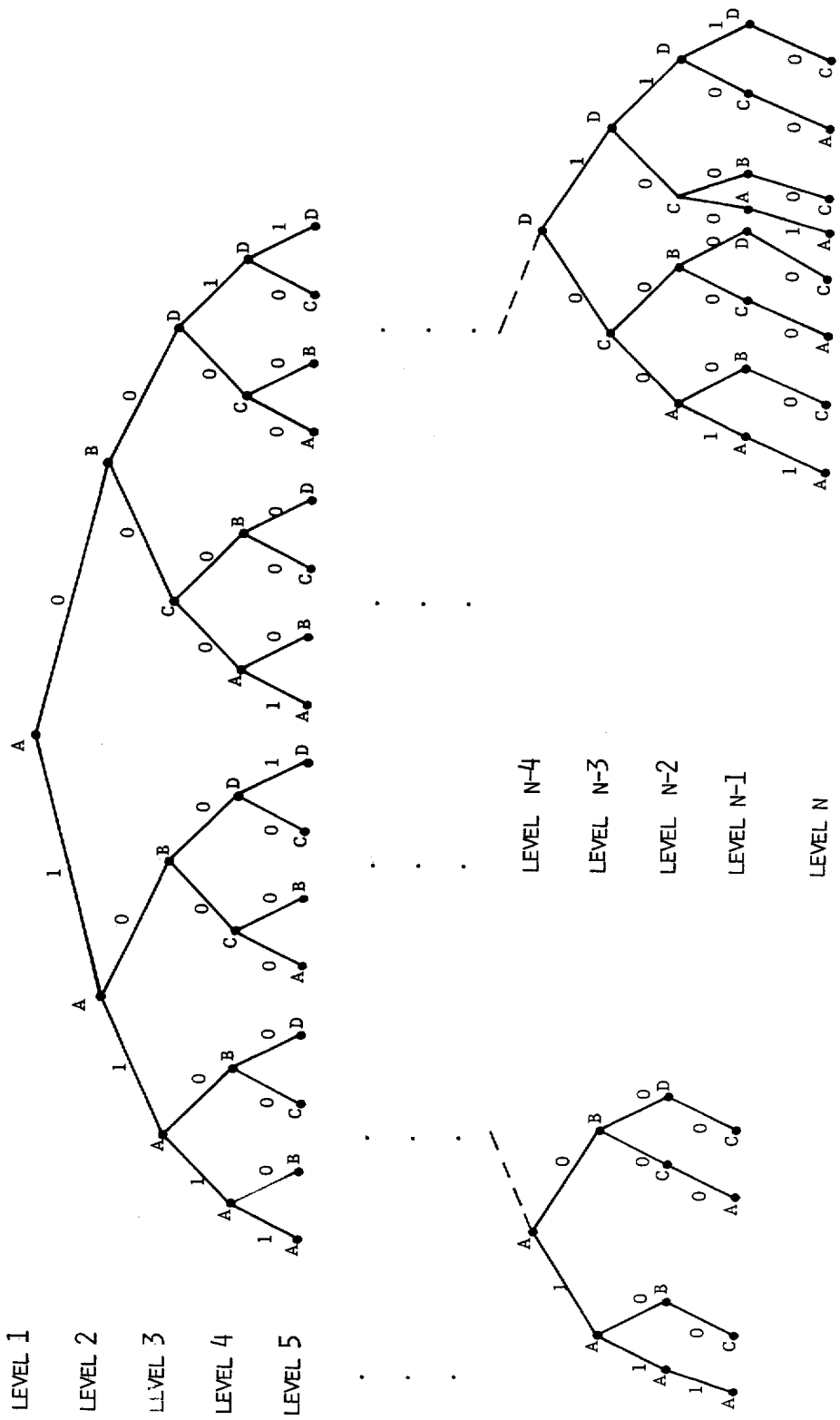
FIG. 3 illustrates a tree of rank n.

The notion of wellformedness, the sets of w.f., s.w.f., and w.w.f. tetracodes of length n, and their respective (bare) streaks are associated with a certain binary tree, referred to as "tree of rank n." A tree of rank n is of height n and is described as follows (see FIG. 3). The root and each node, to level n-3 on the L.H.S. and to level n-2 on the R.H.S., has exactly two successors. The root is labeled A, and, recursively, successors to A are labeled (left & right): A & B; successors of B: C & D; successors of C: A & B; and successors of D: C & D. Beyond level n-3 on the L.H.S., at level n-2 each node has only a left successor, and at level n-1 all nodes are termninal, i.e., without successors. Beyond level n-2 on the R.H.S., at level n-1 each node has only a left successor, and at level n all nodes are terminal. In addition, an edge connecting two A's or two D's is labeled 1, and all other edges are labeled 0.

A tetracode must begin with either A or B. If it begins with A, it can be identified with a unique path in the tree by entering at the root and proceeding to successive nodes by following the remaining letters in the tetracode. The path terminates at a terminal node on the L.H.S., or an A or a C node at level n-1 on the R.H.S. Similarly, a tetracode beginning with B can be traced by entering at the B node at level 2; the path terminates at a terminal node on the R.H.S. Note that as a tetracode is traced through the nodes, its bare streak is traced through the edges connecting said nodes.

A tree is said to be "absorbed" by another tree if all its nodes and respective edges, together with their labels, appear in (part of) the latter, "absorbing" tree. Let the difference between the ranks of two trees be designated by $k>0$. If $0<k \leq 2$, the tree of smaller rank is absorbed by the tree of larger rank when both roots are made to coincide. If $k=3$, the smaller can be absorbed by the larger in two ways, i.e., by coincidence of the roots, or by coincidence of the root of the smaller with the A node at level 2 of the larger. If $k=4$, a third way is added through the coincidence of the root of the smaller with the A node at level 3 of the larger. In general, for $k \geq 5$, there are $$3 + \sum_{i=4}^{k-1} 2^{i-3} + 2^{k-4}$$

ways (i.e., nodes labeled A in the absorbing tree which are qualified for coincidence with the root of the absorbed tree) in which the smaller tree can be absorbed in the larger. Any tetracode of length n is said to be traceable in, or "absorbed" by, a tree of rank n in a unique way; and said tree absorbs exactly the collection of tetracodes of length n. Since all tetracodes are finite, the corresponding absorbing trees are of finite rank. However, in this connection, it is useful to define a binary tree of unbounded rank, by using the previous recursive definition for trees of finite rank without the restriction on the level up to which the recursion applies. In this manner a rooted binary tree is obtained, where the root is labeled A and the tree extends indefinitely; it is referred to as "substrate tree." It is clear that any tree of finite rank is absorbed by a substrate tree in an infinite number of ways, or in a finite number of ways if some large enough finite portion of the substrate tree is considered. Now, since every tetracode is uniquely absorbed by a finite tree and every finite tree is absorbed by a substrate tree, the entire collection of string productions of BIP, and of certain string-manipulation systems derived from it, is absorbed, or embedded, in a substrate tree. Hence, all strings generated and manipulated within said systems, in tetracode or streak modes, are realized as sequences of nodes or edges, respectively, on paths in a substrate tree. In conclusion, the tetracode space is realized in a substrate tree.

Following the description of the tetracode space as a whole, turn now to a description of the structure and dynamics of BIP processing, which are manifested within said space. For a given BIP processing, the length n is finite and fixed for all tetracodes generated, hence all of them are absorbed by the same absorbing tree of rank n. It is clear that, while BIP is indefinite and monogenic, the tree can absorb at most $2^{n-1}$ distinct tetracodes, and therefore a closed, indefinite, cycle of tetracodes must be reached after a finite number $<<2^{n-1}$ of steps. The structure of such cycles is an important element of the present discovery and invention and is disclosed later in considerable detail.

Another important element of these discovery and invention is an apparent dialectical dynamics that shapes the tetracodes generated by BIP processing; said dynamics is brought out and exemplified below. From the definitions of the processes LQD, QDZ, and BIP, it is clear that, in each step of BIP processing each quod undergoes a liquidating step and each quid is quodized, and nothing else occurs. Consequently, BIP processing amounts to endless disintegration of quods into quids and recombination of quids into quods, mitigated by a kind of internal, autonomic, delicate balancing mechanism. It follows that the resulting tetracode patterns must be accounted for by the metamorphoses of quids and quods and the attendant dynamics, which, as it turns out, has classical dialectical properties. Since the entities of quids and quods are initially derived from marks or elements stripped of meanings, and later derive only from their own kinds, they also appear to be essentially without meaning. Whatever significations may be inherent in quids and quods, it is clear that, in their domain of existence, i.e., tetracodes generated in the course of BIP processing, these are the only entities occurring and their only essence is (mutual) contrariety. For instance, appealing to ideographic representation (see FIG. 4C), quids are "discrete" whereas quods are "connected." So, to repeat, whatever these entities may be and whatever they may signify, contrariety is their essence. While discreteness and connectedness are obvious contraries or opposites, particularly important in structural matters, (note here a pertinent quote from Hermann Weyl ("Symmetry," p. 109): "The splitting into something discrete and something continuous seems to me a basic issue in all morphology . . . "), other contrary pairs may be assigned to quids and quods as interpretants, and BIP processing analyzed in terms of such assignments. For example, if one assigns 'NOUGHT' to quids and 'BEING' to quods, and if one calls BIP processing (which amounts to continual liquidating and quodizing) by the term 'BECOMING'; and calls liquidating 'dissolution' and quodizing 'passage into', then the intrinsic opposition between quidness and quodness and its continual resolution through BIP processing is captured by the language: BECOMING continually mediates the dissolution of BEING into NOUGHT and the passage of NOUGHT into BEING. Note that the foregoing statement, which is a legitimate technical description of BIP processing, is all too familiar to the Hegelian who, in fact, may regard it as simply drawn from the heart of the Hegelian dialectic; (as BEING, NOUGHT, and BECOMING constitute the first dialectical triad in the first part, i.e., 'logic of being', in Hegel's "Science of Logic.")

Clearly, as far as this patent specification is concerned, the statement above is mine, not Hegel's, and is strictly a technical statement that reads on the specific technology herein disclosed; by no means is it a statement of speculative philosophy. This inescapable link, or analogy, to the Hegelian dialectic is mentioned here in order to bring out the boundaries of the present invention and stress its potential practical implications. More specifically, the present invention includes, and this specification discloses, the first and only existing symbolic and operationistic (as opposed to merely 'verbal') system, further embodied in digital hardware technology, that captures dialectical logic. The significance of this can be assessed from the fact that the quest for embodiments of dialectical logic is as old as Plato and as current as present-day structuralism, best exemplified by the more recent work of Jean Piaget on the origins of natural intelligence and on, so-called, 'genetic epistemology'.

The dialectic discussed so far is referred to as dynamic or "operative dialectic," since the opposing tendencies and their mediation are more in the nature of processes. In the wake of the operative dialectic, additional level of dialectic emerges, referred to as correlative or "manifested dialectic," which imprints the tetracode patterns with its qualities. At this level the opposing entities and their mediations are structures of tetracodes, rather than processes operating on them. Clearly, the two levels continually interact and are inherently inseparable; the distinction is here made for the sake of orderly description.

A s.w.f. tetracode is referred to as "thesis," if none of its quods is of length greater than 3. The successor of a thesis under TTC is referred to as "antithesis." A thesis and its antithesis are related in such a way that under each quid and each quod in the thesis there is a quod or quid, respectively, of same length in the antithesis. An anti-thesis is said to be "complementary" to its thesis, and together are said to constitute a "complementary pair." Respective complementary substrings are referred to as a pair of "dialectical substrings." The successor of an antithesis under TTC is referred to as "synthesis." Under each quid in an antithesis there is a quod of same length in the synthesis; under each quod of length $\leq 3$ there is a quid of same length; and under each quod of length $m > 3$, there are a monad followed by a quod of length m-2 followed by a monad. A synthesis is said to have a structure that "mediates" the structures in the complementary pair preceding it, in the sense that each pair of dialectical substrings of length $> 3$ yields a partly discrete and partly connected (symmetrical) substring in the synthesis; and, if said length is $\leq 3$ and no such symmetrical resolution is possible, the synthetic substring normally takes on the character, i.e., quid or quod, of the respective substring in the thesis. It should be emphasized that the above intricate rules of complementarity and mediation are derived from observation after the fact, as opposed to being programmed into BIP in advance. A thesis, its antithesis, and the following synthesis, are referred to as (perfect) "dialectical triad."

Figure 6:
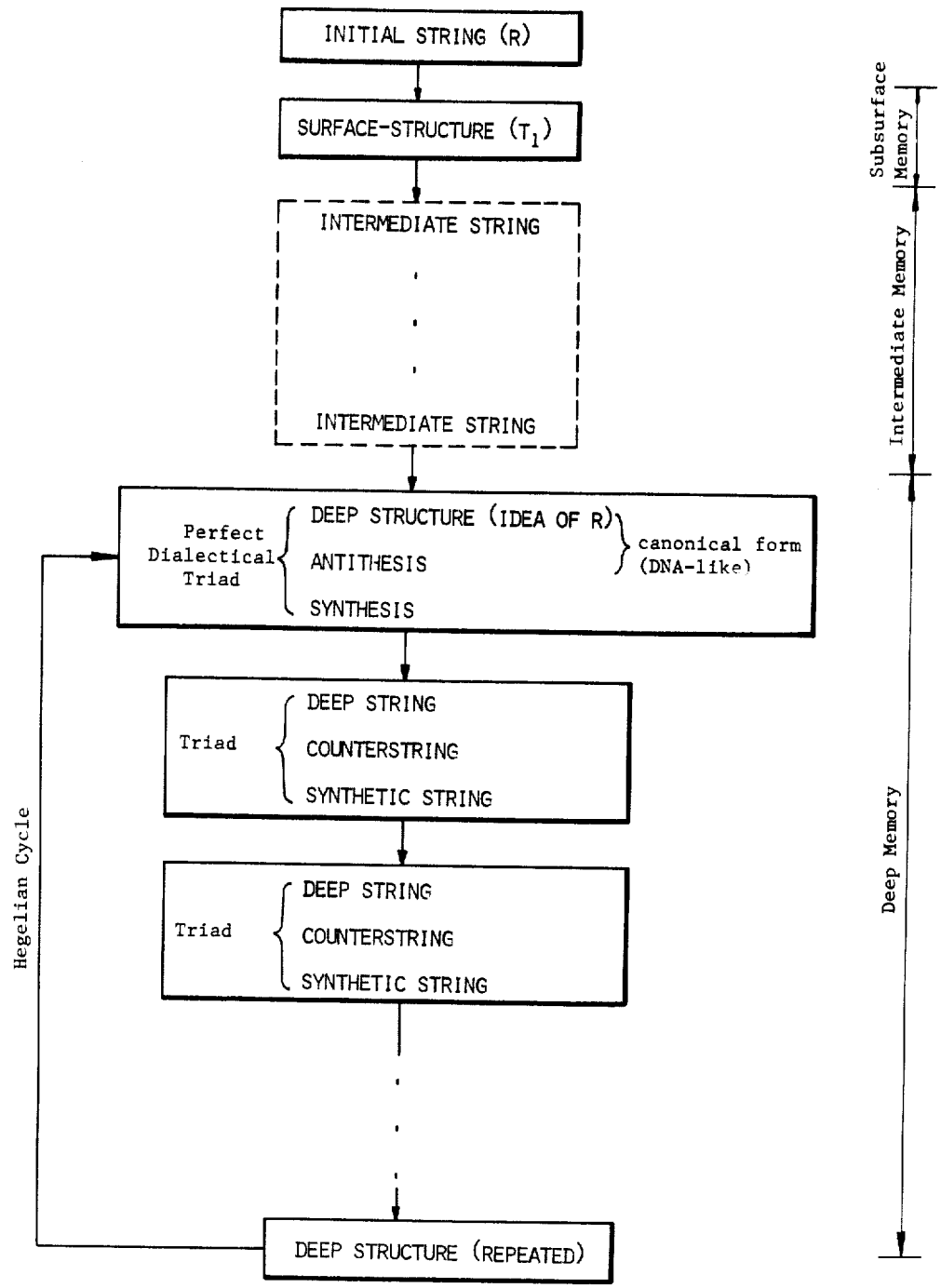
FIG. 6 is a schematic representation of BIP processing.

The following description is supported by FIG. 6. The first string generated, $T_1$, is referred to as the "surface-structure" of the external or initial string, R. $T_1$ may be w.w.f. or s.w.f., depending on the inherent structure of the initial string R. All successive tetracodes are s.w.f. After a finite number of tetracodes are generated, a cycle, referred to as "Hegelian cycle" (H.C.), is reached. Tetracodes in the range between the surface-structure and the beginning of a cycle are referred to as "intermediate." Tetracodes in a H.C. are referred to as "deep" or "internal." The length, l, of a H.C. is the number of distinct tetracodes in it, and can be as small as two. If l=2, a H.C. consists of a complementary pair. If l>2, the tetracodes are basically organized in successive triads; and if l is not divisible by 3, the last (would be) triad is incomplete. Normally, the first tetracode in a H.C. is a thesis, referred to as "deep structure" or IDEA of R. A deep structure together with its antithesis are referred to as "canonical form" of R. (Note in this connection that a canonical form can be adequately characterized as 'information structure comprising a complementary pair of 4-letter strings', which characterization bearing a striking resemblance to that of a DNA molecule, although the complementary rules appear to be somewhat different; hence, the structure of a canonical form is said to be "DNA-like.") The first triad, which includes a canonical form, is normally a perfect dialectical triad. Successive triads are frequently also perfect dialectical triads, but may have certain perturbations or imperfections, especially if the lengths of tetracodes and the cycle itself are large. A triad is referred to as "modified dialectical triad," if its first tetracode contains one or more quods of length=4; and as "imperfect dialectical triad," if its first tetracode contains one or more quods of length >4. The number of intermediate tetracodes may be zero or larger, and they may or may not be organized in dialectical triads; often some do and some do not.

Memory, or more specifically 'dynamic memory' is inherent in this process. The surface-structure is said to be in transitory "subsurface memory"; intermediate strings in transitory "intermediate memory"; and strings of the Hegelian cycle are said to be in "deep memory." Clearly, deep memory is a type of dynamic memory that retains its information indefinitely.

Two concrete examples, illustrating traces of BIP processing, are given in FIG. 4 and FIG. 5, and explained below. Hereinafter, in discussions of said traces, the $i^{th}$ tetracode is designated by Tet(i), and the $j^{th}$ symbol in a tetracode is designated by Sym(j).

In the first example (see FIG. 4A) the external string R='BEGINNING' is of length n=9. The trace displays the following basic features. Tet(01) is the surface-structure of 'BEGINNING', and is followed by eight intermediate tetracodes, Tet(02) through Tet(09), all of which appear only once in this processing. Tet(10) is the first tetracode which is repeated in the sequence, i.e., with the appearance of Tet(22), so that the Hegelian cycle consists of the twelve strings Tet(10) through Tet(21). These are organized in exactly four triads, each of which happens to be a perfect dialectical triad. The triads are:

| | T | A | S |
|---|---|---|---|
| Triad 1: | Tet(10) → | Tet(11) → | Tet(12) |
| Triad 2: | Tet(13) → | Tet(14) → | Tet(15) |
| Triad 3: | Tet(16) → | Tet(17) → | Tet(18) |
| Triad 4: | Tet(19) → | Tet(20) → | Tet(21), | where columns T, A, and S list theses, antitheses, and syntheses, respectively. Analyze in some detail one of the triads, say triad 2, using ideographic representation type IDB (see FIG. 4C):

| Tet(13) = thesis 2 | _d_ _c_ _d_ | d-discrete (quid) |
| Tet(14) = antithesis 2 | _c_ _d_ c | c-connected(quod) |
| Tet(15) = synthesis 2 | _m_ m' m' | m-mediated<br>m'-mediated (short substrings) |

The transition to the next triad (i.e., Tet(16)=thesis 3) is also "dialectical," as follows:

Tet(15) = synthesis 2   u c u c d    u-unitary substring (monad)

Tet(16) = thesis 3:    u d u d c
                        d   c

Here, connected substrings are transformed into discrete, discrete into connected, and unitary substrings (which can be viewed as either discrete or connected) are transformed into unitary. From similar observations on the remaining triads in the cycle it is clear that the entire collection of twelve strings is tied together in a highly organized fashion. Still, more regularities are evident. For example, the first half of the cycle, triads 1 & 2, and the second half, triads 3 & 4, are related by mirror-image symmetries when the second half is juxtaposed to the first half on the right or on the left. For example, in left juxtaposition, Tet(16) and Tet(10) mirror each other, using ideographic representation type IDA, as follows:

Returning to Tet(01) through Tet(09), it is observed that, although the organization of tetracodes outside the H.C. is normally less regular, in this particular example the nine tetracodes are organized in exactly three triads, each of which is a perfect dialectical triad.

Throughout the seven triads the development appears as a form of inference or syllogism. For example, in each triad, the movement from thesis to antithesis to synthesis may be viewed as two separate acts of inference, namely (1) given a thesis, apply the complementarity rule to infer the antithesis, and (2) given both thesis and antithesis, apply the mediation rules to infer the synthesis.

While the above description and analysis uncover unusual and interesting organization, apparent syllogistic activities, etc., it should be stressed again that BIP∞{R} is not programmed or designed, in any real sense, to do any of these things. Furthermore, BIP does not have access to stored programs or external references; is not supplied with any definitions of "strings," "substrings," "discreteness," "connectedness," "complementarity," "mediation," or the like; and is not given any rules of inference or any other rules beyond the extremely primitive rewriting rules of TTC. Now, the rewriting rules of TTC are strictly local, acting in parallel, and myopic, i.e., cannot "see" beyond the string on which they operate, and, within it, each rewriting rule sees at most three contiguous symbols; also, there is no transfer of information across a string to obtain a global view of it. Thus the transformational activity is strictly local and spontaneous, yet it produces global results. It resembles a chemical reaction taking place locally on an exposed photographic plate, that, combined with numerous others, yield a global picture. It is anticipated that, in addition to electronics, implementations in chemical or biochemical systems are particularly suitable for this kind of a process.

In the second example (see FIG. 5) the external string R='SEEPERFECTCYCLE' is of length n=15. The trace displays the following basic features. Tet(01) is the surface-structure, and also the first string in the Hegelian cycle, repeated as Tet(31); (no intermediate tetracodes occur in this example). The cycle consists of thirty strings, Tet(01) through Tet(30), organized in ten triads, some of which are perfect (P), some are modified (M), and some are imperfect (I), dialectical triads. The triads, and their levels of perfection, are:

| Triad 1: | Tet(01) | → | Tet(02) | → | Tet(03) | P |
| Triad 2: | Tet(04) | → | Tet(05) | → | Tet(06) | I |
| Triad 3: | Tet(07) | → | Tet(08) | → | Tet(09) | M |
| Triad 4: | Tet(10) | → | Tet(11) | → | Tet(12) | I |
| Triad 5: | Tet(13) | → | Tet(14) | → | Tet(15) | P |
| Triad 6: | Tet(16) | → | Tet(17) | → | Tet(18) | P |
| Triad 7: | Tet(19) | → | Tet(20) | → | Tet(21) | I |
| Triad 8: | Tet(22) | → | Tet(23) | → | Tet(24) | M |
| Triad 9: | Tet(25) | → | Tet(26) | → | Tet(27) | I |
| Triad 10: | Tet(28) | → | Tet(29) | → | Tet(30) | P |

It is clear that the level of perfection varies with regularity, or symmetry, with respect to the dotted line dividing the two halves of the cycle. In addition, mirror-image symmetry is preserved between the two halves of the cycle, in a way similar to that in the previous example. For instance, in right juxtaposition, arrange triad 6 on the right of triad 1, triad 7 on the right of triad 2, and so on, and for visual aid apply IDA or IDS.

An additional important element of the present discovery and invention concerns certain autonomic error-correcting capabilities inherent in BIP processing. To illustrate the general character of these capabilities I disclose three basic types, representative of others, through specific examples below. The types are:

Type 1: next-step correction
Type 2: regenerated-cycle correction
Type 3: correctness without correction EXAMPLE 1. (next-step correction)

Arbitrarily, take Tet(09) from trace in FIG. 5. Suppose that, because of noise or malfunction, errors have been introduced in Tet(09) to the point where it does not even bear a resemblance to its original make-up or structure, and is not even well-formed; for example,

BCBDBCCCCCCBDDD

Nevertheless, upon application of TTC to the above corrupt string, the result is.

AAAAABDDDDCABDC which is nothing but Tet(10); i.e., the next tetracode is recovered completely, and the rest of the processing is not affected at all.

EXAMPLE 2. (regenerated-cycle correction)

Take Tet(19) from trace in FIG. 4A. Suppose it has been corrupted into 'BCBCDABBC'. In this case, the next step is not sufficient to correct the errors, however, in two steps, i.e.,

BCBCDABBC step 1 AAAAAABCA
step 2 BDDDDCAAA = Tet(05), the processing is restored to Tet(05), and thereafter the cycle (i.e., Tet(10)) is reached in five more steps and is re-established.

EXAMPLE 3. (correctness without correction)

This feature of handling errors is even more unusual. It is entirely possible that a portion of BIP processing, or even the whole of it, will be, so to speak, surreptitiously correct, but ridden with errors and jumble in the actual trace. This odd capability may be very useful in cases where computation is extremely rapid and is carried out in the face of severe noise levels, so that actual correction simply cannot take place. It turns out that, within a very broad range of allowable errors, the jumbled patterns contain the precise or "pure" patterns, and the latter can be recovered at any step. Note that, once interference is stopped, recovery is spontaneous, absolutely without external or internal references, and involves no special error-correcting schemes or procedures, or "keys" and the like. To illustrate, refer to trace in FIG. 4A. Suppose that ITC(BEGINNING) is computed correctly, but noise or malfunction cause the result to be transcribed as 'CCCCDABBB', instead of Tet(01). Suppose, again, that TTC(CCCCDABBB) is computed correctly, but the result transcribed as 'DCCABBCAB', instead of Tet(02). Likewise, in each step, TTC is computed correctly, but errors are tolerated in the actual transcription of the result, so that the next application of TTC is to a corrupt version of the result. Consequently, FIG. 4A may end up looking like the following:

| 00 | B | E | G | I | N | N | I | N | G |
| 01 | C | C | C | C | D | A | B | B | B |
| 02 | D | C | C | A | B | B | C | A | B |
| 03 | D | A | D | A | D | A | C | C | C |
| 04 | C | C | C | C | C | C | D | B | D | etc., yet essentially be a perfectly correct trace! The entire trace of 21 strings may be corrupt and, in fact, because noise is random, Tet(22) would not look like Tet(10), so that, on the surface, a cycle would not even be reached. Nevertheless, the trace would be essentially correct, and on a single application of TTC to any string (in the absence of noise) the correct tetracode will emerge and the rest of the processing will be completely unaffected.

Error-correcting codes and similar schemes are certainly not new to the art. It is clear, however, to persons skilled in the art that autonomic error-correction is distinctly different and decidedly unobvious over the art.

An additional process, essentially a variant of BIP, is specified below.

Process Name:
Basic Intellector Process (streak mode)
Mnemonic:
$BIP_s$
Type:
Indefinite
Process Specification:
Initial String R; length: $n \geq 1$
Process: $BIP_s^\infty\{R\} := TRI^\infty(S_1)$, where $S_1 = S(R)$ (bare)
Trace of Processing: See example below.

EXAMPLE

R = 'BASIC'; n = 5
$S_1 = STR(BASIC) = 0000$ (bare)

$$BIP_s^\infty(BASIC): \equiv TRI^\infty(0000) = \underset{H.C.}{\longrightarrow} \begin{array}{l} 1111 \\ 0110 \\ 0000 \end{array}$$

Figure 2:
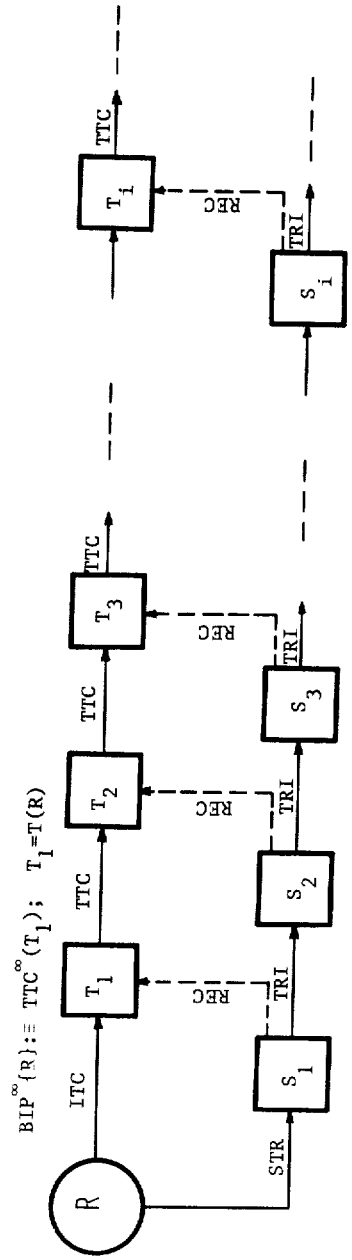
FIG. 2 illustrates schematically the processes BIP and $BIP_s$ and the relationship between them.

The relationship between BIP and $BIP_s$ is illustrated schematically in FIG. 2. $BIP_s$ is said to "shadow" BIP, and since any $T_i$ can be recovered from the corresponding $S_i$ by application of REC to $S_i$, $BIP_s$ and BIP are essentially functionally equivalent. $BIP_s$ appears to be simpler to implement in digital technology, and a preferred embodiment of $BIP_s$ is given in the next section.

From the relationships of LAG and WAG to TTC it is clear that numerous other variations are possible that are essentially functionally equivalent to BIP. The generic term "hegelizing process" is used for such processes. Included among said processes are BIP-simulators, i.e., processes designed or programmed to produce effects of BIP processing, but not necessarily through autonomic modes of operation. A string processed by a hegelizing process is said to undergo "hegelization," and the processing involved is referred to as "hegelizing." $BIP_s$ is an example of a hegelizing process.

Embodiments & Devices

It is clear that the specifications of string-manipulation operations, as disclosed earlier, are complete in scope, definition, and detail so as to enable persons skilled in the art to implement or embody said operations (or processes expressed in terms of said operations), by a variety of means, in data processing systems; that the utility of said operations and processes is substantially in virtue of said implementability; and that actual implementation in data processing systems is an important element and objective of this invention. Hereinafter, said operations and processes, and methods which include them, are referred to as (methods) "implementable in data processing systems." Such implementation may include, but is not limited to, the use of software and hardware digital technologies; including, but not limited to, hard-wired logic circuitry; microinstructions or microcode stored in read-only memory, or in writable control store, or in other types of memories; and programming of said operations or processes in higher-level computer languages, such as FORTRAN or PL/I, in conjunction with the use of general-purpose electronic digital computers to carry out said operations or processes. Further, implementation may include, but is not limited to, the use of chemical or biochemical methods and means; including, but not limited to, the use of artificial or natural materials and substances such as nucleotides, nucleic acids such as DNA, RNA and their many varieties, amino acids, proteins, and the like; said substances being in living or non-living states, within or without living cells; provided that natural mental processes carried out in unaided living human brains are not construed as implementations. It is obvious to persons skilled in the art that many implementation of said operations or processes, in whatever form or mode or combination of forms or modes, which is essentially derivable from, or essentially functionally equivalent to, said operations or processes and/or accompanying examples, descriptions, explanations and disclosures, is indistinguishable from subject matter included in this invention.

For the sake of completeness and definiteness, yet to preserve brevity, I disclose below a preferred hardware embodiment of one primary operation, namely TRI, and of the process $BIP_s^\infty\{R\} := TRI^\infty(S_1)$, where $S_1 = S(R)$; the device embodiment of said process is referred to as INTELLECTOR. It is obvious to persons skilled in the art that embodiments of the remaining operations can be readily designed and implemented using similar standard techniques.

Figure 7:
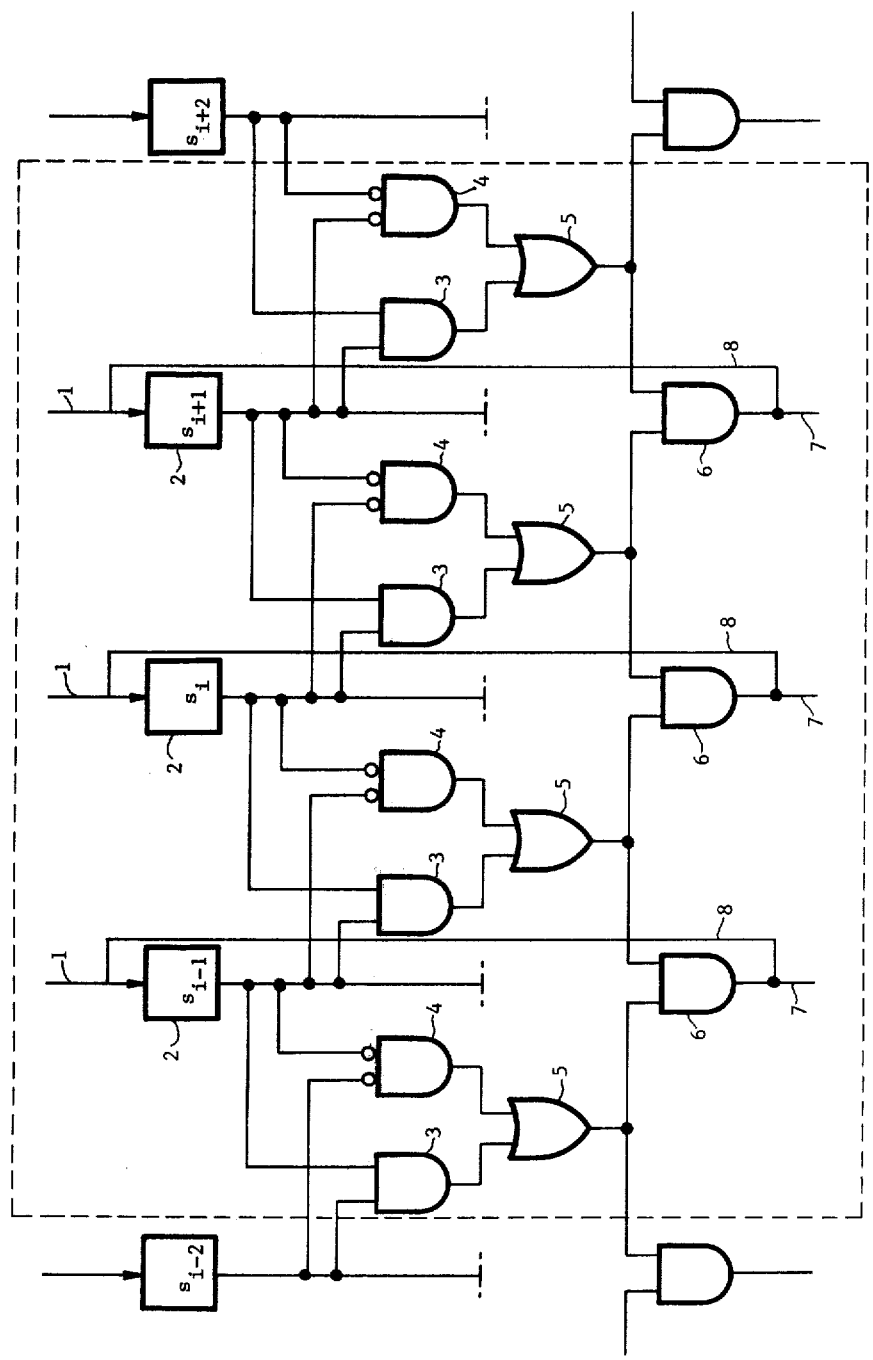
FIGS. 7, 7A, and 7B are logic design diagrams of an INTELLECTOR for processing bare streaks of length n-1, describing the ranges $2 \leq i \leq n-2$, i-1, and i=n1, and i=n-1, respectively.
Figure 7B:
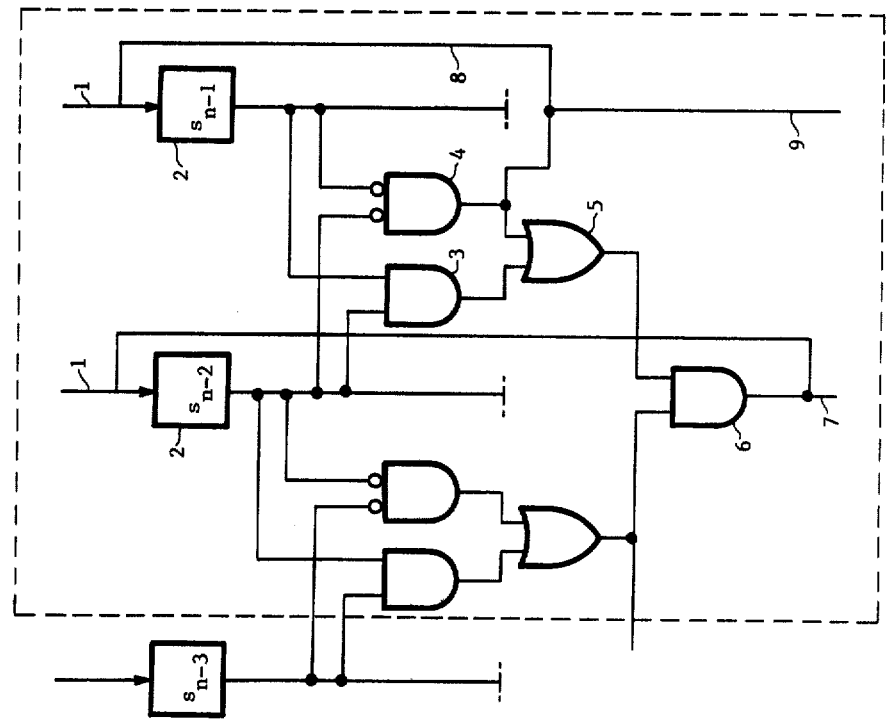
Figure 7A:
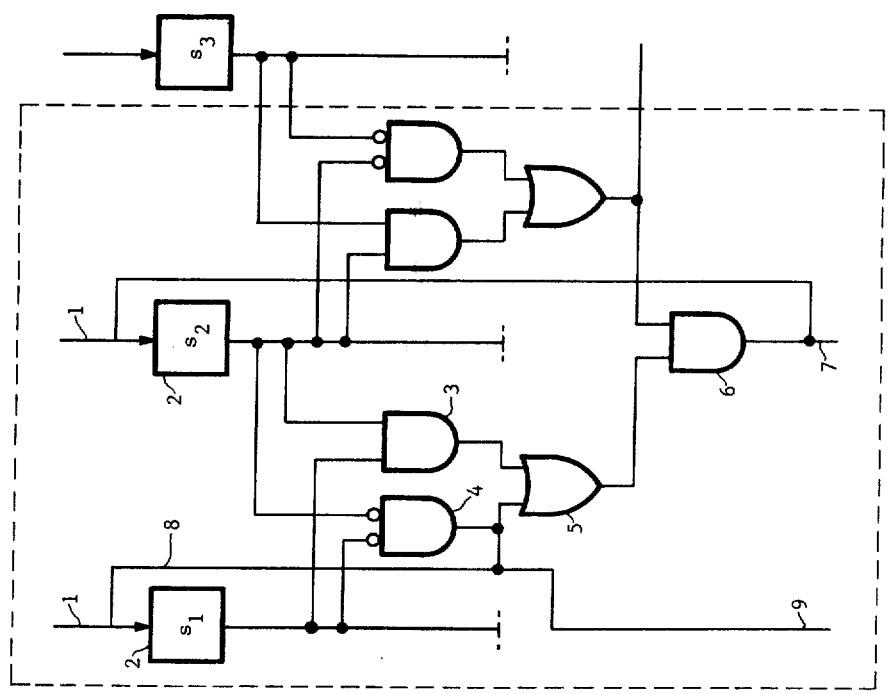

Analyzing the logic requirements of TRI (in bare streak mode), consider the $s_i$'s of the input string as Boolean variables. Rewriting rules (1) and (2) translate into the expression $(s_i \equiv s_{i-1}) \wedge (s_i \equiv s_{i+1})$, for $2 \leq i \leq n-2$; and the expressions $\sim s_1 \wedge \sim s_2$ and $\sim s_{n-2} \wedge \sim s_{n-1}$, for $i=1$ and $i=n-1$, respectively; where '$\equiv$', '$\wedge$', and '$\sim$' are 'equivalence', 'conjunction', and 'negation', respectively. Expressing equivalence in terms of negation, conjunction, and disjunction, the first expression is rewritten as, $((s_i \wedge s_{i-1}) \vee (\sim s_i \wedge \sim s_{i-1})) \wedge ((s_i \wedge s_{i+1}) \vee (\sim s_i \wedge \sim s_{i+1}))$, for $2 \leq i \leq n-2$; where 'V' is 'disjunction'. Finally, the above logical expressions are translated into the logic design diagrams in FIGS. 7, 7A, and 7B, which embody TRI, and, by virtue of the feedback loops, also $TRI^\infty$. The following is a detailed description of the circuitry of INTELLECTOR and its operation.

A bare streak of length $n-1$, represented by bit-signals, is fed via input lines 1 to $n-1$ binary cells 2 of an $(n-1)$-bit register, such that the $i^{th}$ call receives the bit-signal $s_i$, for $1 \leq i \leq n-1$. $s_i$, for $2 \leq i \leq n-2$, is compared simultaneously with $s_i - 1$ and $s_{i+1}$ in the following manner: $s_i$ and $s_{i-1}$ are input, via respective connecting lines, to AND gate 3, and, simultaneously, to NAND gate with negated inputs 4; the outputs from 3 and 4 are input, via respective connecting lines, to OR gate 5; similarly, $s_i$ and $s_{i+1}$ are input, via respective connecting lines, to another AND gate 3, and, simultaneously, to another NAND gate with negated inputs 4; the outputs from 3 and 4 are input, via respective connecting lines, to another OR gate 5, thus completing the comparisons. The outputs from the two OR gates 5 are input to AND gate 6 and the output from 6 is made available to output line 7, whereupon one TRI step is completed. To effect $TRI^\infty$, feedback line 8 is included, and output from 6 is fed back to cell 2, designated $s_i$, whereupon the next TRI step starts.

On the left, for $i=1$ (see FIG. 7A), $s_1$ and $S_2$ are input, via respective connecting lines, to NAND gate with negated inputs 4, and the output from 4 is made available, with proper delay, to output line 9, whereupon one TRI step is completed. To effect TRI$^\infty$, feedback line 8 is included, and output from 4 is fed back, with proper delay, to cell 2, designated $s_1$, whereupon the next TRI step starts.

On the right, for $i=n-1$ (see FIG. 7B), $s_{n-1}$ and $s_{n-2}$ are input, via respective connecting lines, to NAND gate with negated inputs 4, and the output from 4 is made available, with proper delay, to output line 9, whereupon one TRI step is completed. To effect TRI$^\infty$, feedback line 8 is included, and output from 4 is fed back, with proper delay, to cell 2, designated $s_{n-1}$, whereupon the next TRI step starts.

Combinations with Digital Computing Means and Analog Systems

It is obvious to persons skilled in the art that a single INTELLECTOR, or a plurality of INTELLECTORs, can be readily connected, via input lines 1 and output lines 7 & 9 (see FIGS. 7, 7A, and 7B) to other digital systems, including digital data processing means; and, in particular, to a control section of a digital computer system having memory and control sections; such combinations having the advantages of both the autonomic string-manipulation system inherent in INTELLECTORs, and the programmability of conventional digital computer systems. Further, said combinations can be connected to analog systems via analog-to-digital and-/or digital-to-analog conversion means. The scope of the present invention includes any and all such combinations, and any and all data processing methods and procedures made possible by virtue of said combinations.

A few final remarks that go, perhaps, beyond the strictly technical, may help in setting up a conceptual framework for this invention. Without implying that Bertrand Russell was a Hegelian, far from it, it is of interest to note his three-sentence summary of the Hegelian system (see "Hegel's Philosophy of History," (1941)): " . . . Everything proceeds by thesis, antithesis and synthesis, and what moves it is the self-development of the Idea, and the Idea is what Hagel happened to believe. The whole course of the universe is making it just such as Hegel thought it was. That is the formla.".

It may very well be that one or more claims accompanying this patent description ultimately read on the entire universe. Since I readily concede that the natural workings of the universe are beyond anyone's claims, and, furthermore, since there is no present or potential conflict between any such claim and any natural forces, that will burden the courts of this country, it is reasonable to hold that, per se, any such reading is benign. To be more specific, however, any and all claims hereinafter should be construed as pertaining to, and only to, man-made and/or man-controlled or manipulated portions of the universe, provided that mental processes carried out in unaided living individual human brains are specifically excluded from any and all claims.

As I write these pages, in the dawn of the Bicentennial Year Nineteen-Hundred and Seventy-Six, I can hardly refrain from quoting the strange, perhaps prophetic, words of Walt Whitman's "Democratic Vistas," written a century ago: "In the future of these States must arise poets immenser far . . . I say there must, for future and democratic purposes appear poets . . . consistent with the Hegelian formulas and consistent with modern science."

What is claimed is:

1. In data processing apparatus, the method of manipulating a physical representation of a finite string, including storing the resulting recurrent cycle of strings, which comprises:
  (a) interfacing said representation of said string with said apparatus; and
  (b) hegelizing the interfaced representation of said string so as to generate and store in said apparatus the resulting recurrent cycle of strings for a finite duration.

Also, please enter the following corrections by amendment in the above mentioned application.

2. In electrical data processing systems, the method of processing the electrical bit-signals representing the streak of any finite string, including storing a representation of the associated Hegelian cycle, comprising the steps of:
  (a) applying triunation to said electrical bit-signals;
  (b) applying triunation to the electrical bit-signals resulting from the preceding application of triunation; and
  (c) repeating step (b) a sufficient number of times for storing said representation of Hegelian cycle for a finite duration thereby enabling the retrieval of any portion thereof for pattern analysis.

3. The method as in claim 2 with the additional step of:
  (d) outputting trace patterns from said representation of Hegelian cycle for pattern analysis.

4. In electrical data processing systems, the method of processing the electrical bit-signals representing the streak of any finite string, including storing a representation of the associated Hegelian cycle, comprising the steps of:
  (a) generating from said electrical bit-signals electrical bit-signals representing the streak of the tetracode of said string;
  (b) generating from the resulting electrical bit-signals electrical bit-signals representing the streak of the tetracode of the predecessor tetracode; and
  (c) repeating step (b) a sufficient number of times for storing said representation of Hegelian cycle for a finite duration thereby enabling the retrieval of any portion thereof for pattern analysis.

5. In electrical data processing systems, the method of processing the electrical bit-signals representing the streak of any finite string, including storing a representation of the associated Hegelian cycle, comprising the steps of:
  (a) generating from said electrical bit-signals electrical bit-signals representing the tetracode of the tetracode of said string;
  (b) generating from the resulting electrical bit-signals electrical bit-signals representing the tetracode of the predecessor tetracode; and
  (c) repeating step (b) a sufficient number of times for storing said representation of Hegelian cycle for a finite duration thereby enabling the retrieval of any portion thereof for pattern analysis.

6. In electrical data processing systems, the method of processing the electrical bit-signals representing the tetracode of any finite string, including storing a representation of the associated Hegelian cycle, comprising the steps of:

(a) applying tetracoding to said electrical bit-signals;

(b) applying tetracoding to the electrical bit-signals resulting from the preceding application of tetracoding; and (c) repeating step (b) a sufficient number of times for storing said representation of Hegelian cycle for a finite duration thereby enabling the retrieval of any portion thereof for pattern analysis.

7. In data processing apparatus, the method of processing the signals representing the streak of any finite string, including storing a representation of the recurrent cycle of strings resulting therefrom, whether or not said cycle is masked by noise, comprising the steps of:

(a) applying a string-manipulating operation to said signals, wherein said operation is possibly augmented by one or more auxiliary operations then constituting part(s) thereof; and wherein said operation is of a type that is functionally equivalent to the primary operation Triunation, as determinable by functional equivalency tests, such as reduction to truth tables or to Post canonical forms;

(b) applying the string-manipulating operation to the signals resulting from the preceding application of said operation; and (c) repeating step (b) a sufficient number of times for storing in said apparatus said representation of the recurrent cycle of strings for a finite duration, thereby enabling the retrieval of any portion thereof for pattern analysis.

8. In data processing apparatus, the method of processing the signals representing the tetracode of any finite string, including storing a representation of the recurrent cycle of strings resulting therefrom, whether or not said cycle is masked by noise, comprising the steps of:

(a) applying a string-manipulating operation to said signals, wherein said operation is possibly augmented by one or more auxiliary operations then constituting part(s) thereof; and wherein said operation is of a type that is functionally equivalent to the primary operation Tetracoding, as determinable by functional equivalency tests, such as reduction to truth tables or to Post canonical forms;

(b) applying the string-manipulating operation to the signals resulting from the preceding application of said operation; and (c) repeating step (b) a sufficient number of times for storing in said apparatus said representation of the recurrent cycle of strings for a finite duration, thereby enabling the retrieval of any portion thereof for pattern analysis.

9. In data processing apparatus, the method of processing the signals representing an encoding of the mutual relations of elements in any finite string, including storing a representation of the recurrent cycle of strings resulting therefrom, whether or not said cycle is masked by noise, comprising the steps of:

(a) applying a string-manipulating operation to said signals, wherein said operation is possibly augmented by one or more auxiliary operations and if so augmented then said auxiliary operation(s) become(s) constitutent part(s) thereof; and wherein said operation is of a type that is essentially functionally equivalent to any of the primary operations and their functional equivalents, as determinable by functional equivalency tests, such as reduction to truth tables or to Post canonical forms;

(b) applying the string-manipulating operation to the signals resulting from the preceding application of said operation; and (c) repeating step (b) a sufficient number of times for storing in said apparatus said representation of the recurrent cycle of strings for a finite duration, thereby enabling the retrieval of any portion thereof for pattern analysis.

10. In electrical data processing systems, a circuit for processing the binary-word representing the streak of any finite string comprising, in combination:

(a) a clocked register having n binary cells where n is a whole number compatible with the length of said streak and n being three or larger, in combination with means for loading said binary-word into said register;

(b) combinatorial logic means for processing a binary-word held in said register by comparing each bit-signal in said binary-word, except for the leftmost and rightmost bit-signals which are set LOW throughout said processing, with its left-neighbor bit-signal and with its right-neighbor bit-signal and emitting a HIGH bit-signal if said three compared bit-signals are all HIGH or all LOW and otherwise emitting a LOW bit-signal, where HIGH and LOW designate two distinct electrical states; and (c) feedback lines connecting the outputs of said combinatorial logic means to the inputs of said register to enable the loading of a binary-word generated by said combinatorial logic means into said register.

* * * * *